United States Patent
Picard et al.

(10) Patent No.: US 12,546,228 B2
(45) Date of Patent: Feb. 10, 2026

(54) RIM-ROTOR TURBINE SEALING AND COOLING ARRANGEMENT

(71) Applicant: EXONETIK TURBO INC., Sherbrooke (CA)

(72) Inventors: Benoit Picard, Sherbrooke (CA); Jean-Sébastien Plante, Sherbrooke (CA); Mathieu Picard, Sherbrooke (CA); Antoine Gauvin-Verville, Sherbrooke (CA); Louis-Philippe Jean, Sherbrooke (CA)

(73) Assignee: EXONETIK TURBO INC., Sherbrooke (CA)

( * ) Notice: Subject to any disclaimer, the term of this patent is extended or adjusted under 35 U.S.C. 154(b) by 0 days.

(21) Appl. No.: 18/693,643

(22) PCT Filed: Sep. 22, 2022

(86) PCT No.: PCT/CA2022/051409
§ 371 (c)(1),
(2) Date: Mar. 20, 2024

(87) PCT Pub. No.: WO2023/044572
PCT Pub. Date: Mar. 30, 2023

(65) Prior Publication Data
US 2025/0137381 A1 May 1, 2025

Related U.S. Application Data

(60) Provisional application No. 63/292,199, filed on Dec. 21, 2021, provisional application No. 63/247,070, filed on Sep. 22, 2021.

(51) Int. Cl.
*F01D 9/04* (2006.01)
*F01D 5/08* (2006.01)
(Continued)

(52) U.S. Cl.
CPC ............... *F01D 9/047* (2013.01); *F01D 5/08* (2013.01); *F01D 9/041* (2013.01); *F01D 11/02* (2013.01);
(Continued)

(58) Field of Classification Search
CPC . F01D 5/08; F01D 5/225; F01D 25/08; F01D 25/12; F01D 9/00; F01D 9/02;
(Continued)

(56) References Cited

U.S. PATENT DOCUMENTS

| | | | |
|---|---|---|---|
| 2,584,899 A | 2/1952 | Roderick | |
| 4,017,209 A * | 4/1977 | Bodman | F01D 5/187 416/190 |

(Continued)

FOREIGN PATENT DOCUMENTS

| | | |
|---|---|---|
| GB | 2065237 A | 6/1981 |
| WO | 2014126994 A1 | 8/2014 |
| WO | 2018094536 A1 | 5/2018 |

*Primary Examiner* — Elton K Wong
(74) *Attorney, Agent, or Firm* — NORTON ROSE FULBRIGHT CANADA LLP

(57) ABSTRACT

An assembly may include a rim-rotor turbine having a hub adapted to be mounted or connected to a rotating shaft, a rim-rotor, the rim-rotor having a cooling ring defining at least one cooling channel, and a plurality of blades with each of the plurality of blades contacting the rim-rotor. A stator vane assembly is positioned upstream of the rim-rotor turbine, and has an outer shroud defining a main flowpath aligned with the plurality of blades of the rim-rotor turbine and configured to direct hot gas toward the plurality of blades of the rim-rotor turbine, and vanes in the main flowpath. A cooling guide vane assembly has an inner shroud defining a cooling flowpath aligned with the cooling ring of the rim-rotor turbine and configured to direct cooling gas toward the cooling ring of the rim-rotor turbine, and vanes in the cooling flowpath. The outer shroud of the stator
(Continued)

vane assembly is radially inward of the inner shroud of the cooling guide vane assembly, and wherein a circumference gap is defined therebetween.

20 Claims, 14 Drawing Sheets

(51) Int. Cl.
*F01D 11/02* (2006.01)
*F01D 25/12* (2006.01)

(52) U.S. Cl.
CPC .......... *F01D 25/12* (2013.01); *F05D 2240/56* (2013.01); *F05D 2260/231* (2013.01)

(58) Field of Classification Search
CPC . F01D 9/023; F01D 9/04; F01D 9/041; F01D 9/042; F01D 9/047; F01D 11/001; F01D 11/02; F05D 2240/56; F05D 2260/231
See application file for complete search history.

(56) References Cited

U.S. PATENT DOCUMENTS

| | | | |
|---|---|---|---|
| 2011/0247346 A1 | 10/2011 | Kimmel et al. | |
| 2016/0290157 A1 | 10/2016 | Ning et al. | |
| 2018/0245479 A1 | 8/2018 | Spangler | |
| 2019/0323354 A1* | 10/2019 | Plante | .................... F01D 5/045 |

* cited by examiner

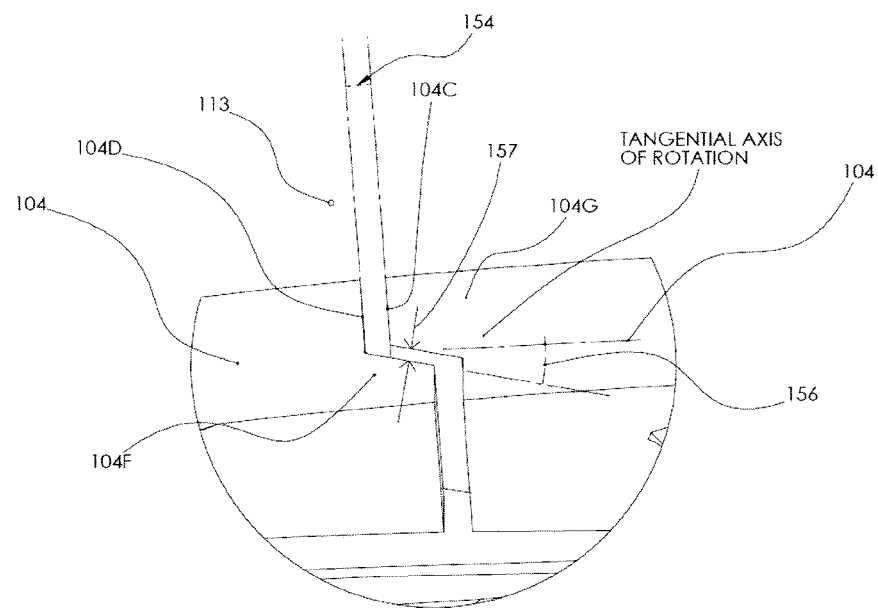
FIG. 3
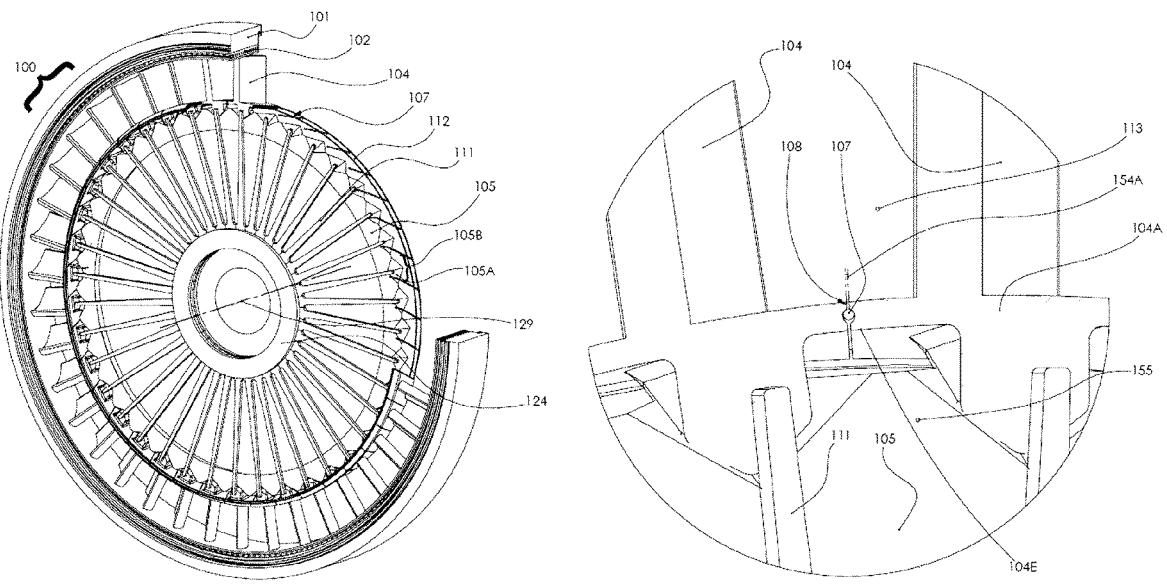
FIG. 4
FIG. 4A

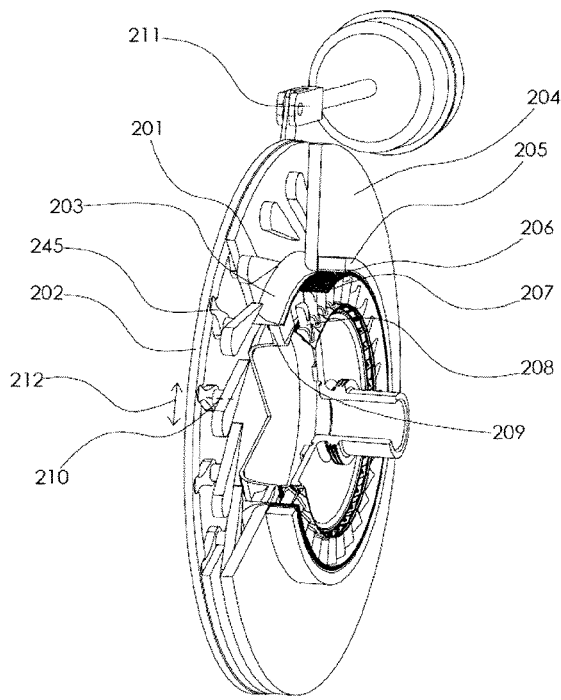
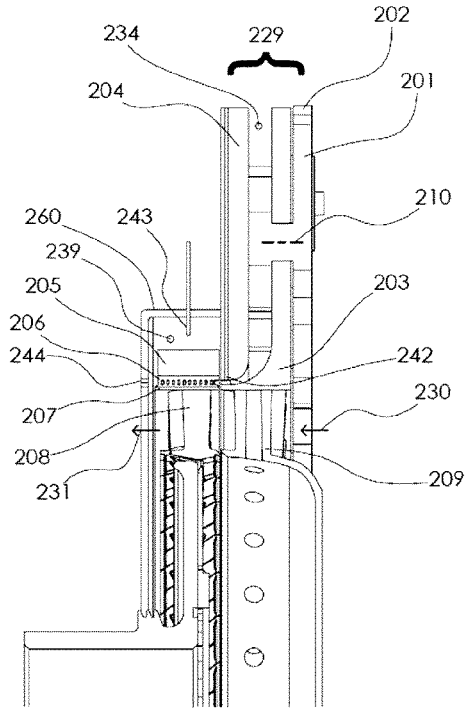
FIG. 17  FIG. 17A
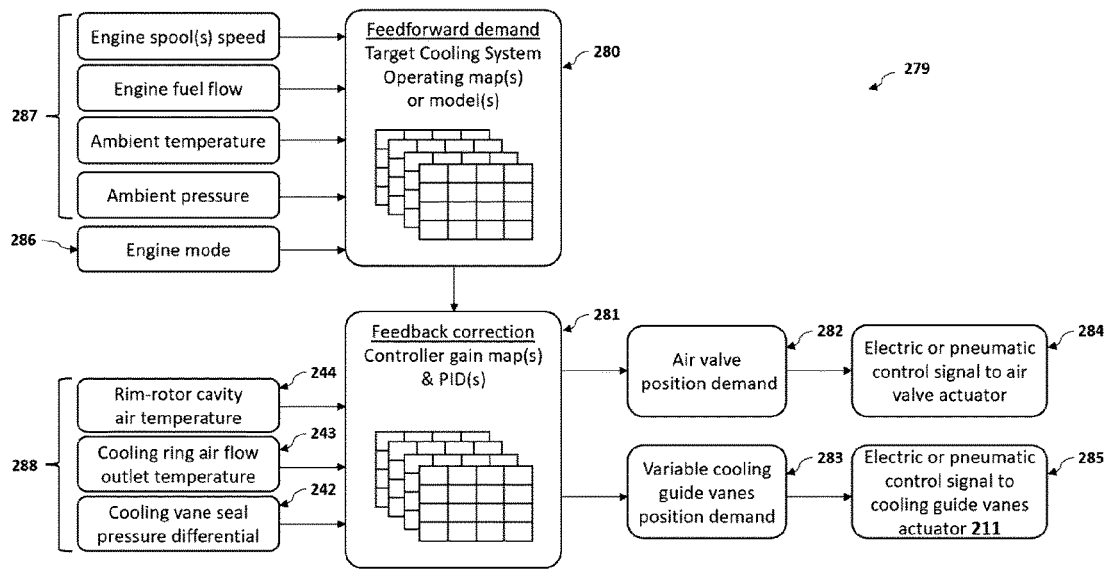
FIG. 18

RIM-ROTOR TURBINE SEALING AND COOLING ARRANGEMENT

CROSS-REFERENCE TO RELATED APPLICATIONS

The present application claims the priorities of U.S. Patent Application No. 63/292,199, filed on 2021, and of U.S. Patent Application Ser. No. 63/247,070, filed on 2021, the contents of both of which is incorporated herein by reference.

FIELD OF THE INVENTION

The present disclosure relates to gas turbine rim-rotor turbomachinery where the blades centrifugal forces are retained by an outer rotating shroud. In particular, the present disclosure relates to the sealing of secondary flow and the passive or active management of secondary flow in off-design operating conditions.

BACKGROUND

Mobile applications require power sources that are compact, have low weight and volume. In addition, due to a variety of factors including global warming issues, fossil fuel availability and environmental impacts, crude oil price, efficiency of power sources is becoming the focus of any transportation industry. For the transportation industry, especially air transportation where reliability is critical, turbines are recognized as offering one of the best solutions. In a turbine, one common principle is that the higher the turbine inlet temperature is, the more efficient the turbine will be. Recuperated Brayton cycles are recognized as providing a better efficiency than simple Brayton cycle.

A challenge with increasing the temperature of a recuperated Brayton cycle lies in the turbine itself, where typical alloys require large amounts of cooling to be able to withstand high gas temperatures. This is even more challenging for small scale turbines (<1 MW) where film cooling is very hard to implement and significantly reduces cycle efficiency. Attempts have been made to use ceramics for gas turbines, such as Silicon Nitride and Silicon Carbide, since these materials can withstand very high temperatures, but due to their brittleness ceramics show reliability issues. Prior attempts have been made to build ceramic turbines contained in a rim-rotor, such as U.S. Pat. No. 4,017,209, but have yet to propose a viable cooling solution for the composite rim-rotor, which is limited by glass transition for carbon-polymer composites, or oxidation for carbon-carbon composites. In this specific cases, cooling air goes through long slender blades operating beyond 1200 C, meaning the air is inevitably pre-heated, and thus, unless large mass flows are used, the air cannot perform any meaningful cooling to composite rim-rotors having a maximum operating temperature in the 250-350 C range, making the approach improper for high-efficiency applications. These attempts have also been limited to purely axial turbine designs, which do not take full advantage of the rim-rotor that could be used for hub-less designs allowing inversed radial, axial or mixed flow configurations that optimize the temperature distribution of the engine packaging by keeping the hot gases on one single side of the turbine wheel, therefore separating structural and thermal loops.

Furthermore, when considering rim-rotor machinery, there is a significant challenge in matching the displacement of the rim-rotor to the displacement of a rigid hub. The rim-rotor also needs to be thermally insulated from the hot combustion gases, with ceramics being a choice candidate due to their low conductivity and high temperature resistance. Some prior art turbines are driven by a flow of high temperature working fluid (e.g., steam, gas, etc.) that is directed over and/or through a series of stages and components (e.g., alternating stationary and rotary airfoils/buckets/blades) within the turbine, to generate power. These components and stages may be located at close proximity (e.g., small clearances) relative to one another so as to decrease working fluid leakage through the system and improve turbine efficiency.

In some systems, working fluid may be contained within the flowpath, and leaks may be reduced by passing a pressurized cooling fluid (e.g., compressor air) about the flowpath, the flowpath contained by a set of seals. Direct leakage of the pressurized cooling fluid into the flowpath and/or of the working fluid out in the cooling fluid of the turbine may reduce turbine efficiency, component and turbine lifespan. As a result of the high temperatures of the working fluid during operation, components (e.g., stators, blades, shells, etc.) may experience a significant increase in temperature, often rising across a temperature range of hundreds of degrees Celsius and resulting in thermal expansion which may require clearances between components, clearances that may cause leakage. As a result, some systems have seals between segmented static turbine components (e.g., stator shells, shrouds, nozzles, gas path components, etc.). In most systems these seals are located away from the flowpath of the working fluid so as to reduce/limit exposure of the seal to the thermal extremes of the working fluid. Such locations may however require additional purge air to cool down the inter-segment chute region. Some other systems include a seal at a closer proximity to the gas path. As a result these seals require active surface cooling to thermally withstand the impact of the hot working fluid flow proximate to the seal surface. These seals may limit turbine design and operation, by requiring a large amount of coolant flow into the turbine system and subsequent leakage into the flowpath, thereby reducing turbine efficiency.

Accordingly, there is a need for a compact turbine that can operate at high air temperatures while reducing the leakage between the hot working fluid and the colder cooling fluid. For maximum efficiency and emissions benefits in power applications, such a turbine would need to be used with rim-rotor ceramic turbomachinery allowing high combustion temperatures, and hence high cycle efficiency.

SUMMARY

In a first aspect, there is provided an assembly comprising: a rim-rotor turbine having a hub adapted to be mounted or connected to a rotating shaft, a rim-rotor, the rim-rotor having a cooling ring defining at least one cooling channel, and a plurality of blades with each of the plurality of blades contacting the rim-rotor; a stator vane assembly positioned upstream of the rim-rotor turbine, the stator vane assembly having at least an outer shroud defining a main flowpath aligned with the plurality of blades of the rim-rotor turbine and configured to direct hot gas toward the plurality of blades of the rim-rotor turbine, and vanes in the main flowpath; and a cooling guide vane assembly having at least an inner shroud defining a cooling flowpath aligned with the cooling ring of the rim-rotor turbine and configured to direct cooling gas toward the cooling ring of the rim-rotor turbine, and vanes in the cooling flowpath; wherein the outer shroud of the stator vane assembly is radially inward of the inner shroud of the cooling guide vane assembly, and wherein a circumference gap is defined therebetween.

Further in accordance with the first aspect, for example, the cooling guide vane assembly includes an outer shroud, the cooling flowpath being defined between the inner shroud and the outer shroud of the cooling guide vane assembly.

Still further in accordance with the first aspect, for example, an upstream portion of the cooling flowpath has a radial orientation relative to an axis of rotation of the rim-rotor.

Still further in accordance with the first aspect, for example, a downstream portion of the cooling flowpath has a frustoconical orientation relative to an axis of rotation of the rim-rotor.

Still further in accordance with the first aspect, for example, the downstream portion of the cooling flowpath is at an angle ranging between 10 and 40 degrees inclusively relative to the axis of rotation of the rim-rotor.

Still further in accordance with the first aspect, for example, a first set of the vanes in the cooling flowpath are oriented to impart an axial or partially axial flow of cooling air.

Still further in accordance with the first aspect, for example, choked throats are defined between the vanes in the first set.

Still further in accordance with the first aspect, for example, an exit angle for the vanes of the first set are between 70 and 85 degrees, inclusively, relative to an axial direction.

Still further in accordance with the first aspect, for example, a second set of the vanes in the cooling flowpath is located upstream of the first set of vanes, and are oriented to impart a radially and tangential flow of cooling air.

Still further in accordance with the first aspect, for example, a projecting end of the outer shroud of the cooling guide vane assembly defines an outer shroud lip seal adjacent to a surface of the rim-rotor.

Still further in accordance with the first aspect, for example, a projecting end of the inner shroud of the cooling guide vane assembly defines an inner shroud lip seal adjacent to a surface of the rim-rotor.

Still further in accordance with the first aspect, for example, the inner shroud lip seal has a surface that is an angle generally corresponding to that of a sliding contact between the blades and the hub.

Still further in accordance with the first aspect, for example, an insulating material is in the gap.

Still further in accordance with the first aspect, for example, the insulating material is a thermal barrier coating on the inner shroud of the cooling guide vane assembly and/or on the outer shroud of the stator vane assembly.

Still further in accordance with the first aspect, for example, a brush seal may be between the rim-rotor and a surrounding structure.

Still further in accordance with the first aspect, for example, the brush seal is mounted to the surrounding structure.

Still further in accordance with the first aspect, for example, a labyrinth seal may be between the rim-rotor and a surrounding structure.

Still further in accordance with the first aspect, for example, the labyrinth seal is mounted to the surrounding structure, the labyrinth seal being opposite a frustoconical surface of the rim-rotor, an angle of the surface of the frustoconical surface generally corresponding to that of a sliding contact between the blades and the hub.

Still further in accordance with the first aspect, for example, each of the plurality of blades are operatively connected to the hub by a sliding contact with the hub allowing at least a radial motion between the blades and the hub to load the blades in compression against the rim-rotor.

Still further in accordance with the first aspect, for example, the sliding contact is defined by complementary sliding surfaces between the hub and the blades.

Still further in accordance with the first aspect, for example, the complementary sliding surfaces are at an angle ranging between 15 to 75 degrees inclusively, the angle being from a rotational axis in a radial-axial plane in which the rotational axis lies.

Still further in accordance with the first aspect, for example, the blades are ceramic blades.

In accordance with a second aspect of the present disclosure, there is provided a rim-rotor turbine assembly comprising a hub adapted to be mounted or connected to a rotating shaft; a rim-rotor; and a plurality of blades with each of the plurality of blades contacting the rim-rotor, each of the plurality of blades operatively connected to the hub by a sliding contact with the hub allowing at least a radial motion between the blades and the hub to load the blades in compression against the rim-rotor; wherein at least one sealing wire is positioned in a gap between opposite surfaces of adjacent ones of the blades.

Further in accordance with the second aspect, for example, the opposite surfaces are defined by platforms of the blades, such that the gap is between platforms of adjacent ones of the blades.

Still further in accordance with the second aspect, for example, a channel is defined in at least one of the opposite surfaces, the channel receiving therein the sealing wire.

Still further in accordance with the second aspect, for example, each of the opposite surfaces defines one of the channels, the sealing wire received in a pair of the channels.

Still further in accordance with the second aspect, for example, the channels are oversized relative to the sealing wire.

Still further in accordance with the second aspect, for example, a chamber is defined between the opposite surfaces and a hub retaining feature radially inwardly, the chamber receiving therein the sealing wire.

Still further in accordance with the second aspect, for example, one of the opposite surfaces defines an angled surface relative to radial, the angled surface being part of the chamber.

Still further in accordance with the second aspect, for example, another of the opposite surfaces defines a radial surface, the radial surface being part of the chamber Still further in accordance with the second aspect, for example, the hub retaining feature defines a channel for receiving the sealing wire.

Still further in accordance with the second aspect, for example, the sealing wire has a U-shape, with legs of the U-shape in opposite gaps of one of the blades.

Still further in accordance with the second aspect, for example, a plurality of the sealing wire are provided, the plurality of sealing wires being interconnected by a circumferential ring.

Still further in accordance with the second aspect, for example, the circumferential ring is in a channel in the hub.

Still further in accordance with the second aspect, for example, the channel in the hub is in a rear sealing surface of the hub.

Still further in accordance with the second aspect, for example, the channel in the hub is part of a frustoconical surface.

Still further in accordance with the second aspect, for example, the frustoconical surface has a same angle as that of the sliding contact.

Still further in accordance with the second aspect, for example, the circumferential ring is in channels in surfaces of the blade platforms.

Still further in accordance with the second aspect, for example, the surfaces of the blade platforms at an angle ranging between 0 degree and a value equal to an angle of the sliding contact.

Still further in accordance with the second aspect, for example, the circumferential ring is wavy to enable contraction and expansion.

Still further in accordance with the second aspect, for example, the circumferential ring is flexible.

Still further in accordance with the second aspect, for example, the circumferential ring has at least one interlocking feature.

Still further in accordance with the second aspect, for example, the circumferential ring has at least one cut.

Still further in accordance with the second aspect, for example, the at least one sealing wire is between the blades and the hub.

Still further in accordance with the second aspect, for example, the at least one sealing wire is located radially inward of the blade root.

Still further in accordance with the second aspect, for example, either of the hub or of a blade sealing surface is inclined at an angle of the sliding contact to allow sealing at all blade positions during operation.

Still further in accordance with the second aspect, for example, one of the sealing wire may be between each adjacent pair of blades.

Still further in accordance with the second aspect, for example, the sealing wire is made of a material selected from the group including metal, pre-formed ceramic, flexible woven or braided rope made from ceramic textile, alumina, and silicon carbine.

Still further in accordance with the second aspect, for example, the sliding contact is defined by complementary sliding surfaces between the hub and the blades.

Still further in accordance with the second aspect, for example, the complementary sliding surfaces are at an angle ranging between 15 to 75 degrees inclusively, the angle being from a rotational axis in a radial-axial plane in which the rotational axis lies.

Still further in accordance with the second aspect, for example, the blades are ceramic blades.

BRIEF DESCRIPTION OF THE DRAWINGS

FIG. 3 is an enlarged close up view of an embodiment of the blade platform gap shaped with a step to provide a radial or partially-radial sealing gap that remove or reduce the impact of outward radial displacement of the blades under operation;

FIG. 4 is a perspective cut view of a rim-rotor turbine that incorporates a blade-to-blade sealing wire enclosed in a cavity between each blade or blade segments, in accordance with another embodiment of the present disclosure;

FIG. 4A is a close-up cut view of the rim-rotor turbine of FIG. 4 embodiment showing a sealing wire and a wire cavity between two adjacent blades;

FIG. 17 is a perspective cut view of a portion of the active rim-rotor cooling system presented in FIG. 16 where an actuated cooling ring guide vanes allows the airfoils to pivot and adjust the degree of swirl injection given to the cooling fluid before entering the cooling ring, in accordance with an aspect of the present disclosure;

FIG. 17A is a cut view of the portion of the active rim-rotor cooling system of FIG. 17 showing additional features such as data measurement location for further control;

FIG. 18 is a block diagram presenting a control strategy allowing the turbine engine to control the active rim-rotor turbine cooling system to best fit the desired operation condition;

DETAILED DESCRIPTION

The present disclosure addresses the challenge of a functional rim-rotor turbine where in a first aspect, the blade-to-hub and blade-to-blade gaps incorporate innovative geometries for the rim-rotor turbine components to reduce, control or eliminate leakages between the main hot working flow vein and hub cavities, so as to improve aerodynamic efficiency and cooling performance to sustainable temperatures where applicable. In a second aspect, the outer rotating shroud cooling system involves innovative geometries for both enhanced performance sealing, for reduced heat transfer from hot component, and for properly oriented cooling flows. The description below explains embodiment of the present disclosure but are not limited to these specific embodiments.

The present disclosure relates to the detailed embodiment of a gas turbine rotating wheel that may have a reverse structural architecture. Prior art turbine wheels have airfoil blades attached to the hub, where the hub retains the blade, creating high tensile stresses in both the hub and the blades. The reverse architecture uses a rotating outer shroud where the blades are in contact at their tips, generating mostly compressive loading in the blades. The centrifugal loads are transferred to the outer rotating shroud, that has construction that typically includes high strength fibers for instance mostly oriented in the circumferential direction as a possibility among others to provide significant tensile strength. This may be referred to as rim-rotor, composite hoop, or structural shroud. Due to the benefit of compressive loading, this architecture has been mostly applied with fragile materials such as ceramics, for their higher-than-metal temperature resisting capabilities, but it would also be suitable for metallic blades in order to reduce cost and turbine weight or increase operating tip speed without affecting the aerodynamic efficiency. Such architecture has been referenced in the literature as rim-rotor turbine wheel (RRT), Compression Structure Ceramic Turbine (CSCT) and Inside-out Ceramic Turbine (ICT).

Figure 1:
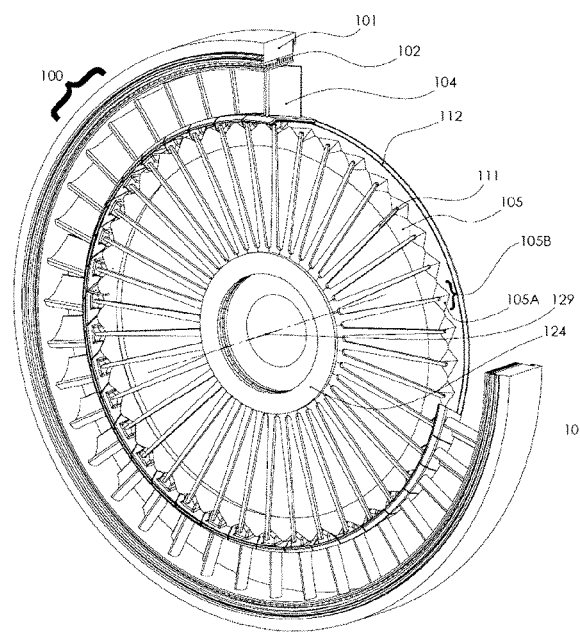
FIG. 1 is a perspective cut view of a rim-rotor turbine using a rim-rotor, ceramic blades with a sliding plane below the root, a matching sliding plane hub and a sealing frustocone shape feature in accordance with the present disclosure.

Referring to the drawings and more particularly to FIG. 1, a rim-rotor turbine assembly 100 is illustrated, in accordance with aspects of the present disclosure. The rim-rotor turbine wheel of FIG. 1 is one component of a gas turbine engine or other turbomachine. A flow of hot gases expands through the rotating rim-rotor turbine wheel 100, which extract energy from hot gases to convert the energy to a mechanical shaft power. This power may be transferred to a compressor, a generator, a propeller or fan or other mechanical load, through a gearbox if required, among different possibilities. The rim-rotor turbine wheel 100 may be used in conjunction with other rim-rotor turbine wheel(s), or other turbine wheel types, on the same shaft or on different shafts in multi-spool turbine engine arrangement. Flow guiding vanes or inlet guide vanes may be used upstream of each rim-rotor turbine wheel to accelerate the flow tangentially in order for the rotor to convert the gas pressure into tangential momentum that can be converted into mechanical power by the rim-rotor turbine wheel 100. For consistency, the expressions "rim-rotor turbine" or "rim-rotor turbine wheel" is used herein to describe embodiments of FIGS. 1-16, as the assembly shown may be part of a rim-rotor turbomachine, with other components of the turbine engine being absent from the figures so as to focus on the rim-rotor turbine wheel 100.

The annular surrounding structure may include a rim 101, also referred to as outer rim, outer structural ring, continuous ring, or also as rim-rotor, though rim-rotor may include other annular components as expressed above and below. In a rim-rotor turbine, the rim 101 may generally have a diameter ranging from 5 cm and 80 cm, though it may be more or less. The rim 101 may be made of different materials. In an embodiment, the rim 101 is made of a composite material, the composite material being fibers in a polymer matrix. To maximize operational speed, minimize weight and provide structural rigidity, the fibers may be carbon fibers, as an option among others. For example, the carbon fibers may be a high modulus and/or high strength grade. A portion of the fibers (e.g. a substantial portion) may be oriented mostly tangentially (length of fibers along the circumference) to maximize the tangential properties of the composite rim 101. A lightweight matrix with proper compatibility with carbon fibers may be used to provide the properties required for high speed operation (e.g. rotation per minutes RPM of, but not limited to, 130 000, for a 400-600 m/s or more rim tangential speed). A polymer matrix with high temperature resistance is preferred, from polymer families such as cyanate-ester, polyimide or phthalonitrile, but other polymers may be used depending on use conditions. As other possibilities, the rim 101 may be made of a ceramic matrix composite (CMC), a metal matrix composite (MMC), among possibilities.

As further part of the surrounding annular structure of the rim-rotor turbine 100, a cooling ring 102 may be integrally connected to the rim 101. The cooling ring 102 may be positioned radially inward of the composite rim 101. The cooling ring 102 may include an air-cooled fin array and/or a non-conductive material, as detailed below, air circulation channels, etc. A low-conductivity layer or coating layer, referred to as a thermal barrier 103, may be integrally connected to the cooling ring 102 (if present) or to the composite rim 101. The thermal barrier 103 is annular, and is radially inward of the composite rim 101 and of the cooling ring 102. In an embodiment, the surrounding annular structure of the rim-rotor turbine 100 includes the rim 101, the cooling ring 102 and the thermal barrier 103, from radially outward to radially inward. In some other embodiments, the cooling ring 102 may not have fins, or may be provided with other cooling features.

In the rim-rotor turbine 100, the cooling ring 102 and the thermal barrier 103 define a structural insulation layer between a plurality of turbine blades 104 and the composite rim 101. This architecture may allow the use of ceramic material rated for high temperature use, for the blades 104. The blades 104 are mainly loaded in compression as retained by the composite rim 101 that takes the centrifugal loads in tensile stresses. The structural insulation between the blades 104 and the composite rim 101 must resist high compressive stresses while providing a high thermal gradient. The inner side, or hot side, of the thermal barrier 103 is in contact with the blades 104 at an elevated temperature, and the outer side, or cold side, must be below or near the composite maximum operating temperature, hot and cold being merely used as relative terms. To provide the high thermal gradient, the structural insulation layer may have the cooling ring 102 in the form of an air-cooled fins array that generates a radial heat flux, and the thermal barrier 103 may be a low-conductivity layer or coating applied between the blades 104 and the cooling ring 102. The thermal barrier 103 must be strong in compression to transmit the centrifugal loads from the blades 104 to the cooling ring 102, and sufficiently compliant to follow the structural and thermal expansion of the cooling ring 102.

Referring concurrently to FIGS. 1-3-4-5, the blades 104 of the rim-rotor turbine 100 may each include an inner shroud portion 104A, which can be referred as the blade platform or lower platform, and a blade root 104B. The blade roots 104B are connected to a hub 105 (also known as disc or disk), and to a spring-mass pusher 111, or other blade biasing component. The hub 105 may be connected to or may be part of a shaft, such as an output shaft. The individual blades 104 are retained by the hub 105 so as to be free to move radially to follow the radial expansion of outer shroud (i.e., rim 101, the cooling ring 102, the thermal barrier 103) of the rim-rotor turbine 100 under rotation. The blades 104 maintain radial contact at their tips with the outer shroud. The rim-rotor turbine 100 maintains its integrity under rotation and transfers the power to the turbine drive shaft connected to the hub 105 by having the blades 104 maintain a contact with the hub 105. The rim-rotor turbine 100 may maintain suitable rigidity achieved by forcing the blades 104 to move following a sliding plane 123 (or sliding surface(s)) between the blade roots 104B and surfaces 105A of hub slots 105B. The expression "plane" is used as the surfaces 123 shows a rectilinear path in the figures, but one or multiple surfaces 123 may be viewed as forming a frusto-cone, flat or angular segments distributed on a frusto-cone. Reference is made to an angle of slide contact, as a way to express the direction of movement of the blades. In the depicted rim-rotor turbine 100, the blade roots 104B and the hub slots 105A define v-cut shape in the plane perpendicular to the sliding plane 123, as a configuration among others. A dovetail root, a rectangular root, a rounded root, a fir-tree or other root shape perpendicular to the sliding plane are considered functional alternatives. Each blade's sliding plane 123 is placed at an angle 121 from the rotational axis 129 (i.e., axis of rotation of the rim-rotor turbine 100, and same for 200) which results in a preselected axial blade movement based on the radial displacement. The sliding plane angle 121 minimum value may be based on the static coefficient of friction between the blade 104 and the material of the hub 105 to ensure the blade 104 will not jam on speed ramp down. A high angle reduces the static friction necessary at maintaining a high rigidity under dynamic vibration. Therefore, values for angles 121 between 15 and 75 degrees are possible depending on materials and rigidity needs, with a contemplated value of 35 degrees providing sufficient margin on the static friction to avoid ceasing on rotational speed ramp down while ensuring the static friction is sufficient to avoid sliding due to unbalance forces.

To maintain the blade root 104B in contact with the sliding plane 123, an axial force may be applied on the blade 104, such as on a blade root 104B front face. This axial force is created by the spring-mass pusher 111 in contact with the blade root 104 and with a retainer part 124, such as for instance a nut, or an abutment surface connected to the hub 105. The spring-mass pusher 111 imparts a spring effect or like biasing force resulting in an axial force on the blade roots 104B. To allow an axial relative position and motion of the blades 104 while maintaining contacts, the spring-mass pusher 111 may include radial cuts creating individual beam springs per blade, the beam springs projecting from a common spring-mass center ring. As the rim-rotor turbine 100 starts rotating, the blades 104 start moving axially, thereby reducing the spring preload. The spring may be installed so the beam springs are bent slightly backwards, providing an increase in axial force applied on the blade roots 104B during high rotational speed. The spring-mass pusher 111 may have a radially non-uniform section to vary its stiffness and bending point location. It may also include a continuous surface to reduce drag or windage loss at high rotational speed, in the same or in a separate component. The spring-mass retainer 111 may be radially retained by a hub feature such as a rabbet, press-fit or another part with higher strength and rigidity tangentially to reduce individual beam stress at root. In case the spring-mass is supported sufficiently by adjacent parts, each finger may be cut independently forming a non-continuous center ring to reduce tangential stresses in the lower section.

Referring concurrently to FIGS. 1, 3, 4 and 5, the hot flow of gases in the turbine main vein flows through the rim-rotor turbine 100, from front or inlet 114 to rear or exit 115, where the static pressure may be higher at the inlet 114 than at the exit 115, so as to drive flow momentum and effectively extract power by the aerodynamic blades 104. The front hub cavity 130, radially inward of the main vein and between the hub 105 and the turbine inlet guide vanes (not shown, upstream of the rim-rotor turbine 100), may be maintained at slightly higher static pressure than that of the main vein by pressurized air (referred to as hub cooling flow) to avoid or reduce the leakage of hot flow gases into the front hub cavity 130. Such leakage would reduce the hot vein mass flow, directly reducing the power and efficiency of the rim-rotor turbine 100. In a similar manner, the aft hub cavity 131, located radially inward of the main vein and between the hub 105 and the following inner skin 134 of the following turbine stage inlet guide vane or the exhaust diffuser, may be maintained above the main vein aft pressure 115 by hub cooling pressurized air to avoid or reduce leakage. The difference in pressure between the front hub cavity 130 and the aft hub cavity 131 or between the front hub cavity 130 and the turbine exit region 115 may result in excessive cooling air flowing from front to rear if the air can freely cross between the two cavities through open areas between the blades 104 and the hub 105. The pressurized air for hub cooling air requires work transferred to a compressor, which may be connected to the rim-rotor turbine 100 through a shaft or externally. Therefore, excessive cooling flow would result in higher compressor work, reducing the turbine power output and efficiency.

Figure 1A:
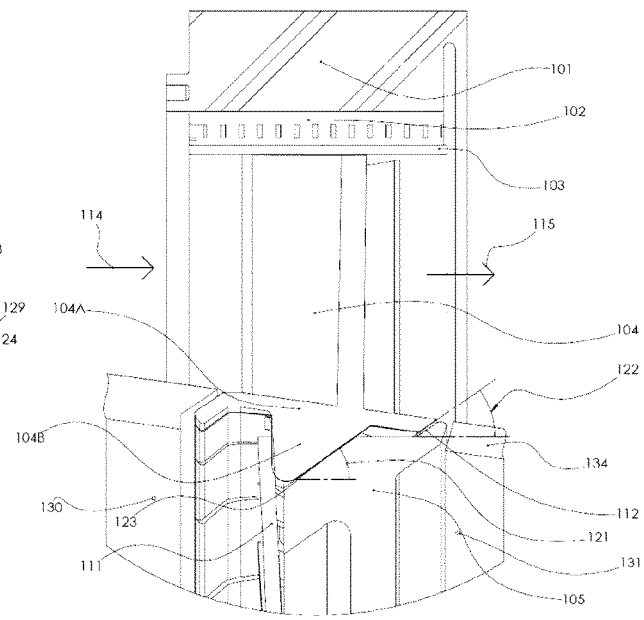
FIG. 1A is an enlarged cutaway view of the rim-rotor turbine of FIG. 1 showing the sealing frusto-cone gap between the blades and the hub formed at an angle matching the blade root sliding plane angle.

Referring to FIG. 1, an embodiment to limit or control the air-cooling flow passing from the hub front cavity 130 to the exit regions 115 131 may introduce a blade-to-hub sealing gap 112 between a frustoconical surface on either or both the blade platform 104A aft portion and the hub 105. The size of the sealing gap 112, which can be defined as the smallest distance between the frustoconical surface and opposed surface, depends on the manufacturing tolerances acceptable and the cooling flow required, typically between 10 and 200 µm. In the case where the hub 105 material has to be maintained below the blade 104 temperature, the design gap can be sized in order to set the hub cooling air mass flow between the two cavities (front 130 to rear 131), effectively controlling the cooling performance and maintaining the hub 105 below its maximum temperature. On a cut view in the axial-radial plane as in FIG. 1A, the sealing gap 112 is set to an angle 122 relative to the sliding plane 123 angle 121. This angle 122 allows the blade 104 to move along the sliding plane 123 while maintaining the sealing gap to the design value. The nominal sealing gap may be kept constant by having the frustoconical angle 122 set to the same value as the sliding plane angle 121 (e.g., ±5 degrees). To cope with thermal and structural deformation or change by-design the sealing gap at different operating conditions, the frustoconical angle 122 could be designed with a difference to the sliding plane angle 121. Indeed, as typically the speed ramp is faster than the temperature ramp at engine start-up, the blades 104 would typically move outward first, and when the hub 105 and blades 104 heat up, the blades 104 would move down the sliding plane 123. Therefore, using a smaller angle for the sealing frustoconical angle 122 than the sliding plane angle 121 would result in an increase of the cooling flow as the parts heat up.

To further insulate the hub 105 from conduction and/or convection and/or radiation, as another embodiment, a thermal barrier coating may be applied on all or selected outer radial surfaces of the hub 105 exposed to the blade platform 104A and root 104B underneath surfaces. The hub slots 105B may be coated to reduce conductive heat transfer between the blade roots 104B and the hub slots bottom surfaces 105A. The thermal barrier may include various layers (the layers being for instance annular), such as a bond coat, a top coat and a low-friction coat. The thickness of the thermal barrier is selected to provide sufficient thermal insulation while limiting the stresses at the bonding interface. The density, the thermal conductivity and the compressive strength of the thermal barrier are therefore important characteristics to provide adequate rim-rotor turbine 100 performance. The top coat may be a ceramic top coat with different base materials and mixtures. In a variant, the top coat is yttrium-stabilized-zirconia (YSZ). In another variant, the top coat may be yttrium aluminum garnet (YAG). In an embodiment, the top coat has thickness of 100 µm up to 1000 µm, inclusively, though the thickness of the top coat may be outside this range as well. The top coat may have a porosity level between 10 and 40%, inclusively. If the top coat is a YSZ coat, a density may range between 4.2 and 5.5 g/cc inclusively, while the range of density for a top coat of YAG is 25% lower than that of the YSZ coat, between 3.2 and 4.2 g/cc inclusively. Properties suitable for this location are a thermal conductivity of around 1 W/Km, a mechanical compressive strength of at least 100 MPa and a minimum strain of 0.5% before cracking/spalling to limit heat conduction and resist mechanical stresses. To improve adhesion of the top coat to the base material of the hub 105 and/or to increase corrosion resistance, a bond coat may be applied, as for example a bond coat of MCrAlY (Nickel/Cobalt-Chrome-Aluminium-Yttria), NiAl (Nickel-Aluminium) or other mixtures. A thickness of the bond coat may range from 50 to 150 µm, inclusively. The bond coat applied may have a 5 to 15% porosity, inclusively, to provide strain resistance, to better match thermal elongation of the top coat relative to the hub 105, and to increase the adhesion of the top coat. The coatings used for the bond coat and/or top coat can be applied by different methods, for example air plasma spray (APS), high velocity oxygen fuel (HVOF) or physical vapor deposition (PVD), providing a layer of porous material. The structure of the layer of bond coats and/or top coat are arranged in order to provide sufficient compression resistance for the compressive loads associated with the blade root 104A contact pressure on the sliding plane 123. To ensure adequate assembly tolerances, the thermal barrier coating may be ground after the coating process to obtain the final hub slots surfaces 105B at the right sliding plane 123 angle 121 and proper surface roughness. The coating may contain low-friction dry lubricant, directly within the top coat mixture (e.g. Boron-Nitride), or applied as an extra coat above the top coat. The reduction of the effective friction coefficient between the blade root 104A and the hub 105 may provide additional design flexibility in the sliding plane angle 121 selection or increase safety margin against gripping for a given design.

Figure 2:
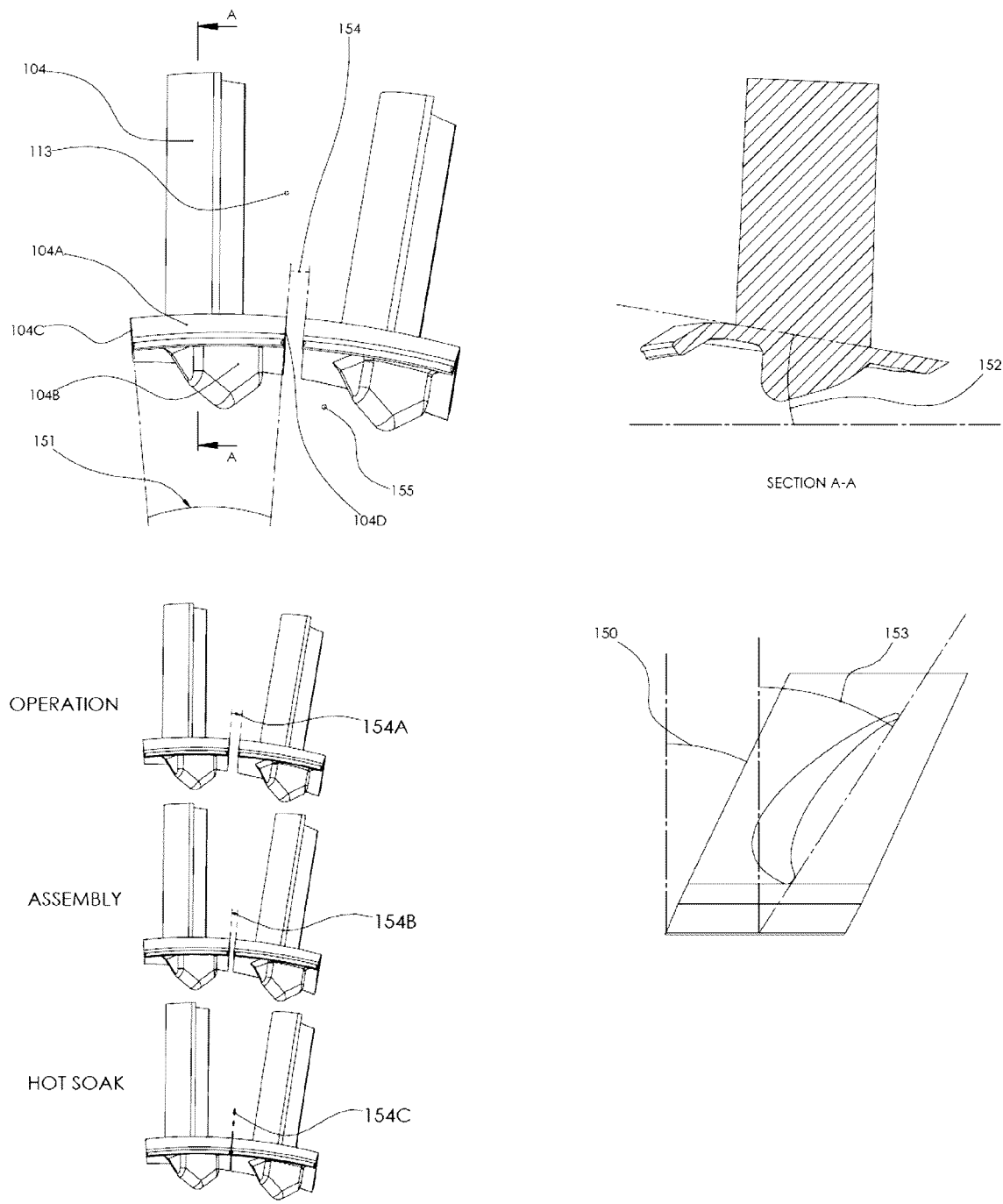
FIG. 2 is a set of detailed views of a blade construction of the rim-rotor turbine of FIG. 1 showing 3 compounded blade construction angles and a blade platform gap exaggerated under rotating and operating conditions.

In addition to the possible leakage between the blades 104 and the hub 105, any opening between two consecutive blades 104 may be detrimental to the performance of the rim-rotor turbine 100. As illustrated in FIG. 2, the blade lower platforms 104A may have platform side surfaces 104C 104D formed by the compounding of three angles: (1) the top view or axial cut angle 150 which may be identical or closely related to the blade stagger angle 153 between 0 and 45 degrees, (2) the blade lower flare angle 152 between 0 and 25 degrees selected for aerodynamic performance, (3) the blade platform front view side's angle 151 which may be 0 degree (parallel) or may be given by the number of blades (360 divided by the number of blades). The tangential blade-to-blade platform gap 154 is sized to prevent contact between the platforms at assembly and any operating conditions to avoid local stresses that could results in blade damage, taking into account manufacturing and assembly tolerances. In the event of a hot soak, where the rim-rotor turbine 100 rotation is stopped while the blades 104 are still hot, the hot soak blade-to-blade platform gap 154C is reduced from its assembly size 154B. In the inverse situation, under high-speed operation, the operating blade-to-blade platform gap 154A may increase substantially, which may double in circumferential size. In the case where hub cooling flow is flowing below the blade platform 104A, larger gap size would induce larger losses of cooling flow, increasing compressor load and power requirement. There may be a case where the pressure in the blade platform cavity 155 is lower than the main vein 113 pressure, driving hot flow between the blades 104. In both cases, reducing the size of the operating platform gap 154A is important to maximize turbine stage efficiency. The blade in FIG. 2 is depicted with uniform aerodynamic profile and simplified blade platform 104A, however, structural ribs or increased platform thickness may be introduced following state-of-the-art stresses analysis. Additionally, state-of-the-art aerodynamic optimization may also result in the implementation of hub to tip profile variation, often referred as blade twist. The radial stacking of these profile may also be adjusted to minimize stresses in the blade and ensure adequate or uniform pressure distribution at the blade tip.

Referring to FIG. 3, to minimize the impact of the blade-to-blade platform gap 154 varying dimension between assembly, operation and hot soak, both blade platforms planar sides 104C 104D (i.e., surfaces of adjacent blades 104 facing each other) may have matching surfaces that form a radial or radial-tangential blade-to-blade gap 157. In the case where those matching surfaces are completely along the tangential axis, the blade-to-blade gap 157 would be maintained constant at assembly and at each operating condition since all blade radial movements are the same. To reduce tensile stresses in the blades under platform extending regions 104F 104G and improve manufacturing processing, the matching surfaces may be set at an angle 156 from the tangential axis, preferably between 10 and 30 degrees, inclusively.

As illustrated in FIG. 4 and in FIG. 4A, an embodiment to prevent or reduce leakage between the blade platforms 104A may include a sealing wire 107 between adjacent blade platforms 104A, whether it be for the gaps between all platforms 104A, or selected platforms 104A (i.e., one or more). In this embodiment, the wire 107 is captive in a slightly oversized wire chamber 108, where the operating platform gap 154A may be between 25% and 50% of the sealing wire 107 diameter, though it may be larger or smaller as well. The wire chambers 108 may be defined in opposite surfaces of adjacent blade platforms 104A, such that the sealing wire 107 is received in a pair of such chambers 108, though it is also considered to have only one of the opposite surfaces of adjacent blade platforms 104A be equipped with a chamber 108. The oversizing is optional, but may ensure that under centrifugal loads, the sealing wire 107 applies pressure on both adjacent blade platforms 104A, thereby preventing or reducing leakage between the main vein 113 and the blade platform cavity 155. The pressure applied by the sealing wire 107 under centrifugal load may also increase the rigidity of the blade assembly, increase its natural frequency, reduce fatigue stresses and/or increase turbine engine service intervals. The sealing wire 107 can be made of high temperature metallic material. In cases where blades 104 are made of ceramic and the sealing wire 107 is exposed to temperatures surpassing the maximum suitable temperature for metallic wires, a pre-formed ceramic wire, or a flexible woven or braided rope made from ceramic textile may be used, i.e. where alumina, silicon carbine or other high temperature yarn may be used. The geometry of the wire is not limited to a round cross-section (e.g., resulting from an extrusion), as other geometries, such as square, triangle, are considered functional alternatives. Additionally, non-extruded shapes with varying cross-sectional profiles along the wire may improve sealing or assembly. The sealing wire 107 may be formed by folding or rolling thin sheets, stamped from round or flat material. The sealing wire cross section may not be continuous, integrating changes in its cross section to allow attachment to the blade or hub providing sealing wire positioning features. A segment or the integrity of the sealing wire may include a spring feature applying bias on the two adjacent blades or between the hub and the blades, to support assembly steps or maintain a specific force throughout operation.

Figures 5, 5A:
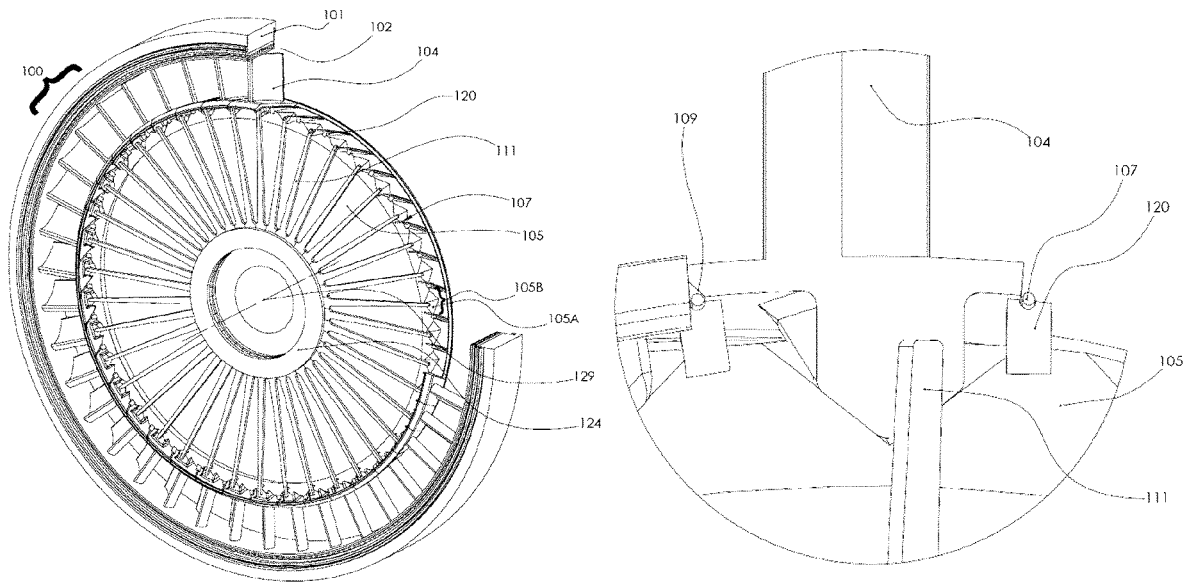
FIG. 5 is a perspective cut view of a rim-rotor turbine that incorporates a sealing wire to be wedged by centrifugal force between a radially cut blade platform and an angled cut adjacent blade platform, where the wire is retained for falling toward the rotating axis when non-rotating by a retaining feature on the hub, in accordance with another embodiment of the present disclosure.
FIG. 5A is a close-up cut view of the rim-rotor turbine of FIG. 5 detailing the blade cut angle and the retaining feature on the hub.

As the operating stresses in the blade platforms 104A could increase locally due the cut-out of the sealing wire chamber 108, specifically at the under platform extending region 104E, the sealing wire 107 may be placed in a multi-part sealing wire chamber 109, where a hub retaining feature 120 prevents the sealing wire 107 from leaving towards the rotating axis, the hub retaining feature 120 located radially inwardly (optionally with a channel), and where the blade platforms 104A form the top part of the chamber 109. As illustrated in FIG. 5 and in FIG. 5A, to simplify the blade geometry, one blade platform 104A side may be maintained as a flat surface and the other blade platforms 104A side may be formed by an angled chamfer or like angled surface (i.e., not radial), effectively wedging the sealing wire 107 between the adjacent blade platforms 104A.

Figures 6, 6A:
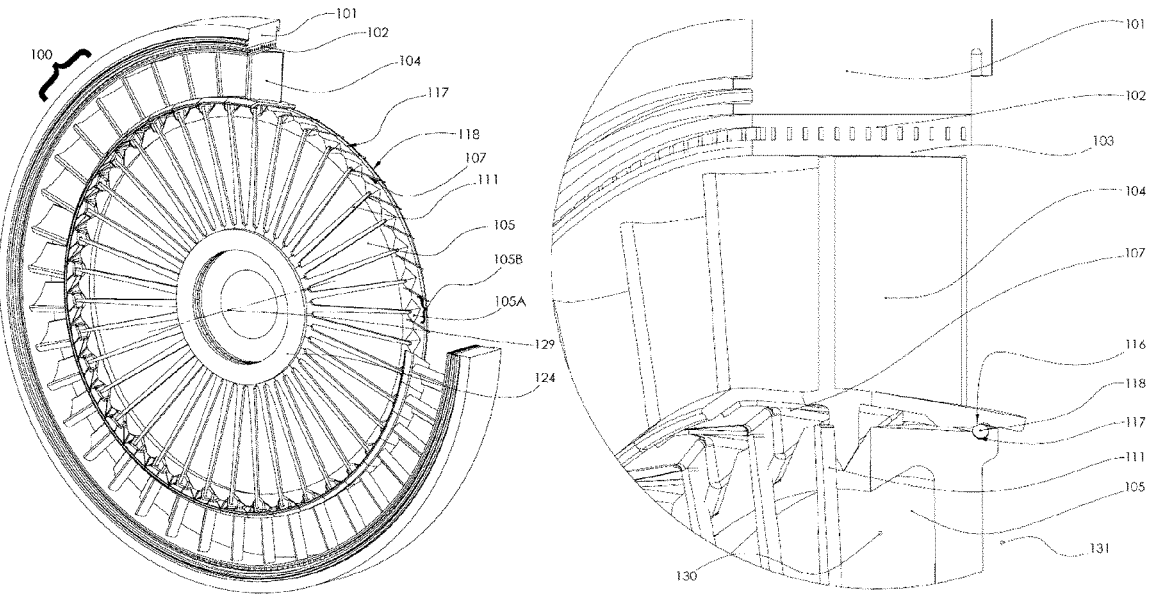
FIG. 6 is a perspective cut view of a rim-rotor turbine that incorporates a circumferential hub-to-blade sealing wire where the circumferential sealing wire maintain a contact pressure to both the hub and each individual blades under centrifugal loading.
FIG. 6A is a cut close-up cut view of the rim-rotor turbine of FIG. 6 showing the wire within its cavity formed by the blade lower platform and the hub.

Referring to FIG. 6 and FIG. 6A, the blade-to-blade sealing wire 107 may be complementarily installed with a blade-to-hub circumferential sealing wire 118, and this may apply to all embodiments featuring the sealing wire 107, such as those shown in FIG. 4 and FIG. 5, for example. The blade-to-hub wire 118 may be referred to as a connection ring, wire ring, etc, could contribute to prevent or reduce leakage flow between the front hub cavity 130 and rear hub cavity 131 by applying a sealing pressure on both the blade rear sealing surface 116 and the hub rear sealing surface 117. This sealing pressure under operation is generated by the centrifugal force acting on the circumferential sealing wire 118. To allow movement of the blade 104 on the sliding plane 123 and allow the circumferential sealing wire 118 to follow the blade movement, the hub rear sealing surface 117 may define a frustoconical surface at the same angle as the sliding plane angle 121. The opposed surface on the blade platform 104A may be set to an angle 116 between 0 degree and the angle of the sliding plane 121 and retain sufficient pressure under rotation to effect a sealing action between both surfaces.

Figures 7, 7A:
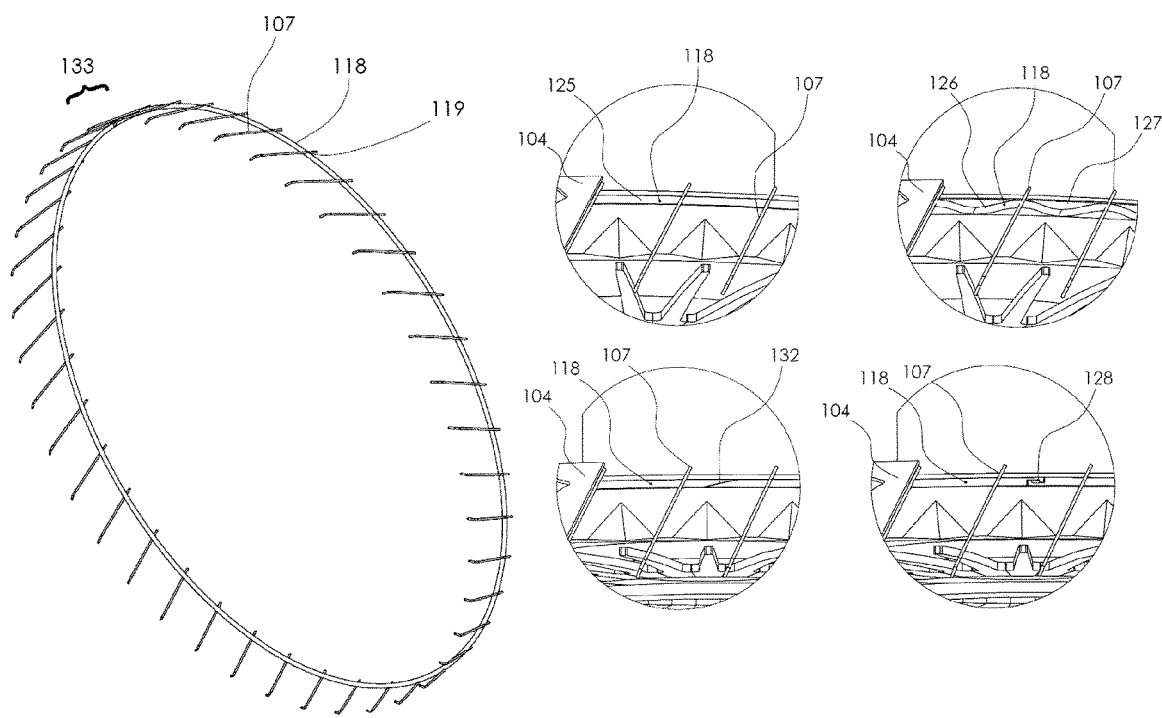
FIG. 7 is a perspective view of a wire assembly composed of a continuous circumferential hub-to-blade sealing wire attached to each blade-to-blade sealing wire.
FIG. 7A is a set of a close-up views of the wire assembly of FIG. 7 within the rim-rotor turbine with the blade removed for the image, showing different aspects to address thermal and structural expansion under operation, such as wavy spring feature, angled cut or hook features in the circumferential wire.

Referring to FIG. 7 and to FIG. 7A, the blade-to-blade sealing wires 107 may be joined by brazing or welding with the blade-to-hub circumferential sealing wire 118 at each wire intersection 119, or be formed into a single piece by molding, forging, stamping, cutting machining or additive manufacturing. Such assembly could be make flat and rolled to form the final circular assembly 133, resembling a single-side squirrel cage. Such pre-assembly may facilitate assembly of the sealing system into the rim-rotor turbine 100 and could alleviate the need to have under support for the blade-to-blade wire 107 to prevent them from falling towards the rotating axis when the rim-rotor turbine 100 is not in rotation, therefore either not requiring enclosed type wire chamber 108, or hub wire retaining feature 120 or only needing partially enclosed or supporting features. To support the change in radius of the blades 104 and the hub 105 under operation, the blade-to-hub circumferential wire 118 material may be selected to have sufficient elastic strength to sustain all conditions and remain in a tangential position 125. The wire 118 may be designed with flexible region 126 (e.g., a wavy geometry as illustrated) between each blade that allows compliance by enabling either elastic or plastic deformation. The wire 118 may have radial or angular cuts 132 to avoid tensile loads in the wire 118, or may have one cut between each blade to provide the blade-to-blade sealing wire 107 the capacity to follow each blade platform 104A without creating stresses at the intersection 119. Interlocking feature with small tangential gaps 128 may be present within the cuts to allow tangential elongation while minimizing the sealing gap created by the cut. Still in FIG. 8, it can be observed that the sealing wire 107 may not be straight, with the free tips of the sealing wire 107 being bent or formed with a radially inward shape, as a function of the gaps to seal.

Figure 8:
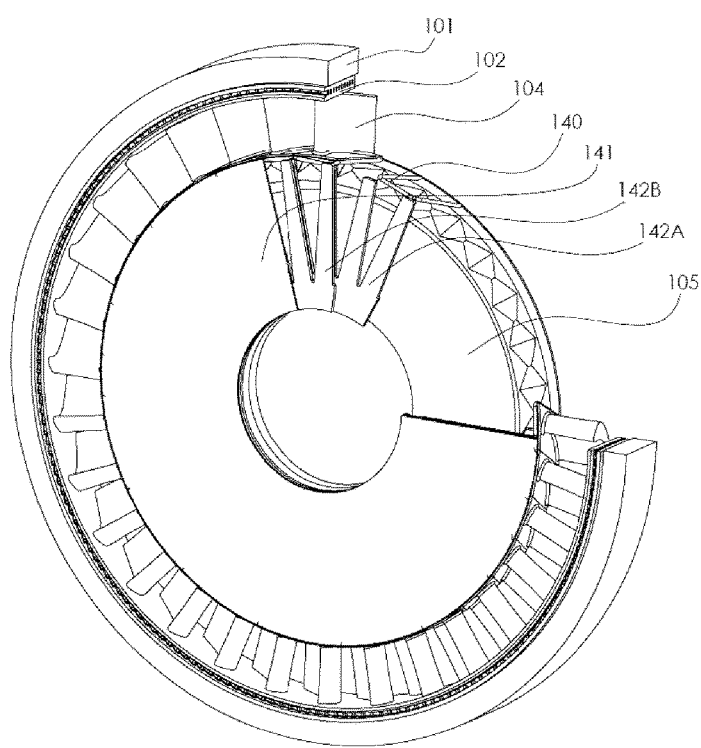
FIG. 8 is a perspective cut view of a rim-rotor turbine stage section showing the static component, a nozzle guide vane and a cooling guide vane, and the rotating rim-rotor turbine. In this embodiment, the compact cooling guide vanes have static airfoil radially or axial (or partially radial-axial) to inject the cooling air with tangential speed and reduce entry losses within the rotating cooling channel in the rim-rotor cooling system.
Figure 8A:
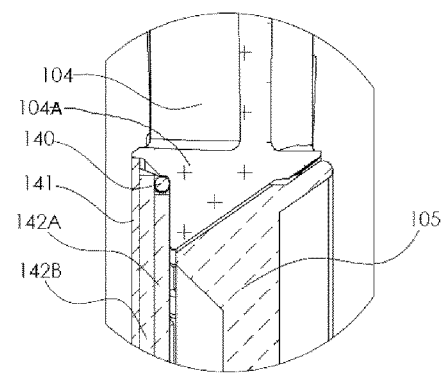
FIG. 8A is a cut view of the rim-rotor turbine stage section of FIG. 8 showing an embodiment that have a compact cooling stator vane to minimize pressure losses and heat transfer to the cooling fluid before it reaches the rim-rotor turbine.
Figure 9:
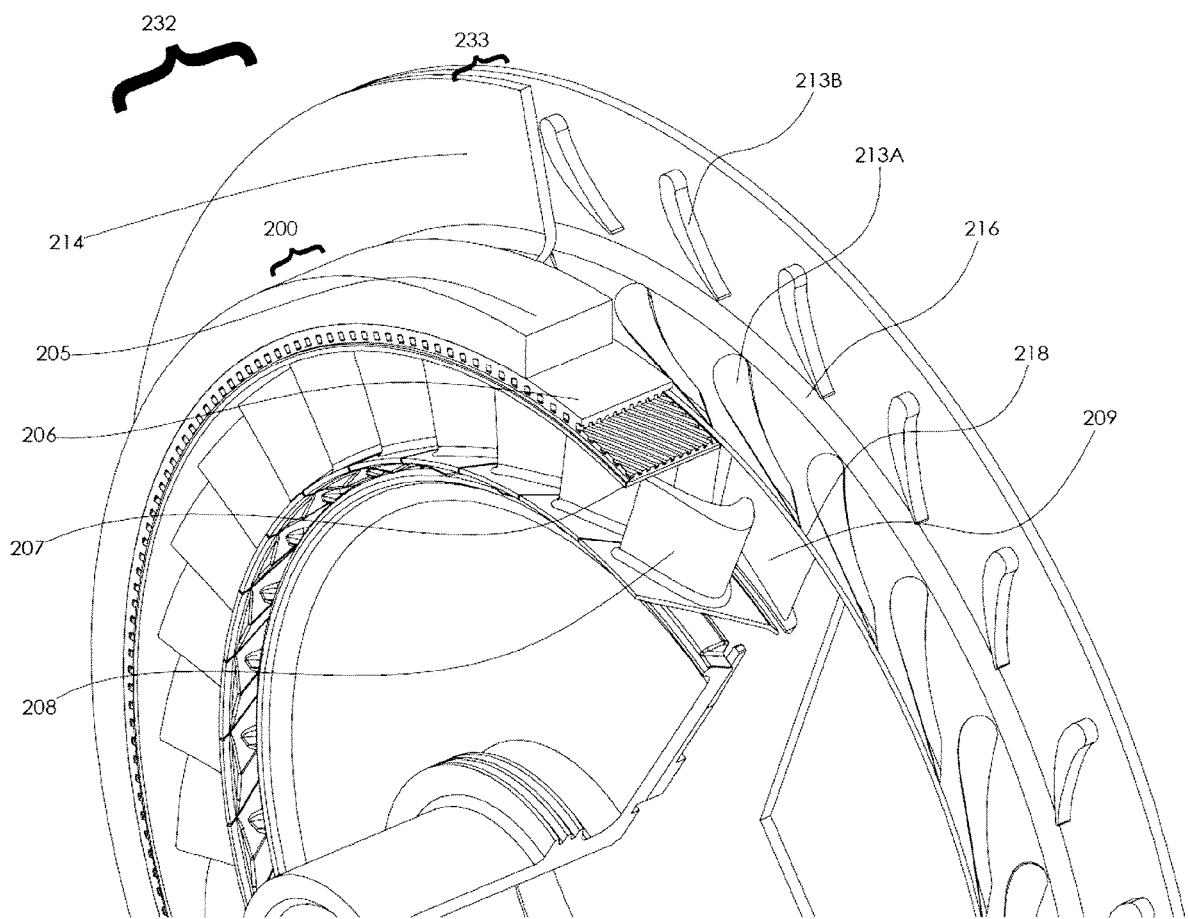
FIG. 9 is a perspective cut view of a rim-rotor turbine with a cooling and main flow stators constituting one turbine stage, which may be repeated for higher expansion pressure ratios, in accordance with another embodiment of the present disclosure.

Referring to FIG. 8 and to FIG. 8A, blade-to-blade sealing wire 140 may be retained in its location by encapsulating its front section within a cavity formed by the blade lower platform 104A, the spring pusher 142A 142B and/or a face shield 141. The face shield may be present as a radiation shield between the hub 105 spring 142A 142B assembly and the hot component installed in front of the rim-rotor turbine 100. In the case where the independent fingers of the spring pusher 106 142A 142B are not required to compensate manufacturing variability, the face shield 141 may also be used directly as a spring pusher. The spring pusher may have different lengths, for example, a short spring pusher 142A may support radially the blade-to-blade sealing wire 140, where a long spring pusher 142B may retain axially the blade-to-blade sealing wire 140. If individual wire seals present installation challenges, the sealing wire 140 may have a u-shape as shown, and have each of its leg positioned between two adjacent blade-to-blade sealing cavities or gaps between adjacent blade platforms 104A. This arrangement provides half the wire count compared to an approach were one wire is needed for each blade.

Referring concurrently to FIGS. 9 to 13, a rim-rotor turbine stage is illustrated, and may include a rim-rotor turbine 200, an assembly of nozzle guide vanes 209 (NGV, could be referred as a main flow stator, or inlet guide vanes IGV) and a cooling guide vane assembly 233. The rim-rotor turbine 200 has a similar arrangement as that of the rim-rotor turbine 100 described above, with a rim 205, a cooling ring 206, a thermal barrier coating 207 and airfoil blades 208. The description provided above for the arrangement of such components in the rim-rotor turbine 100 applies to the rim-rotor turbine 200, notably for the sliding arrangement between the blades 208 and hub, as some or all of the components describe for the rim-rotor turbine 100 may be found in the rim-rotor turbine 200. The nozzle guide vanes 209 airfoils are formed to accelerate the turbine engine hot gases and create gas momentum that is converted into usable mechanical torque by the rim rotor turbine 200 blades 208, where the hot gases flow from the main vein turbine stage inlet 230 to the main vein rim-rotor turbine outlet 231. The assembly featuring the vanes 209 may be described as a stator vane assembly positioned upstream of the rim-rotor turbine 200 (or 100), and maybe said to be static as it does not rotate while the rim-rotor turbine 100 or 200 rotates. The stator vane assembly has an outer shroud 217 defining a main flowpath, e.g., for the main vein, with the main flowpath aligned with the plurality of blades 208 of the rim-rotor turbine 100 or 200 and configured to direct hot gas toward the plurality of blades 208 of the rim-rotor turbine 100 or 200. An inner shroud may be present as well as shown, such that the main flowpath may be annular or tubular. Vanes 209 may be in the main flowpath.

The rim-rotor turbine 200 shown in FIGS. 9-13 may require cooling air to flow through the cooling ring 206 to maintain the rim 205 under its maximum operating temperature, and improved insulation performance may be achieved with the addition of a thermal barrier coating 207 to the inner surface of the cooling ring 206. In this embodiment, the cooling air flow from a compressed air source, which may be a compressor attached to the turbine shaft, or separate shaft or external compressor, is directed towards the cooling ring 206 channels. As it is beneficial to have cooling flow entering the cooling ring 206 at a comparatively low temperature in order to reduce the temperature of the rim 205, direct and indirect heat transfer between any hot component such as the blades 208 or the nozzle guide vanes 209 and the rim-rotor cooling air must be reduced as much as possible. Flowing the cooling air through a cooling guide vane assembly 233 placed radially outward of the assembly of the main flow nozzle guide vanes 209, allows the injection of fresh cooling air from a cooling air injection location or section 234 radially outward of the main vein (not limited to radial flow inlet, as the injection may have an axial component at the inlet). As this injection point(s) is external to the main vein, an air-cooler heat-exchanger may be integrated in the air cooling flow circuitry prior to the cooling air injection section 234 to reduce the temperature of the cooling air entering the cooling ring 206, effectively reducing the cooling mass flow required and improving the turbine engine power and efficiency.

The cooling guide vane assembly 233 may be described as having an inner shroud 217 defining a cooling flowpath aligned with the cooling ring 206 of the rim-rotor turbine 200 (or 100) and configured to direct cooling gas toward the cooling ring 206 of the rim-rotor turbine 200 or 100). Vanes may be in the cooling flowpath.

Still referring concurrently to FIGS. 9 to 13, as the rim-rotor turbine 200 operates under high rotating speeds, and the cooling ring 206 requires air flowing inside its channels, the air flowing from the static frame or structure, i.e., the cooling guide vanes assembly 233, into the rotating frame, i.e., rim-rotor cooling ring 206, must accelerate tangentially. The cooling guide vanes assembly 233 may thus have cooling guide vanes 213, upper shroud 214 and lower shroud 216, that may be manufactured in one or multiple parts. The tangential velocity may be imparted to the cooling air by the cooling guide vanes 213, which may be a series of tangentially stacked airfoils with an inlet mostly radial or axial, and an outlet at the desired tangential angle for cooling air to flow into the cooling ring 206 channels with limited pressure losses. The cooling guide vanes 213 may impart mostly radially and tangential flow for ease of fabrication, as depicted by the radial cooling guide vanes 213B (referred to as a second set as a possibility), and/or may incorporate an axial or partially axial flow, as depicted by radial-axial cooling guide vanes 213A in FIG. 10 and in FIG. 10A (referred to as a first set as a possibility). The angle 215 between the rotating axis and the cooling vanes flow outlet is preferably, but not limited to, between 10 and 40 degrees inclusively. Because the cooling guide vane assembly 233 is annular, the cooling flowpath may be said to be annular, and in a variant the outlet has a frustoconical geometry. As the flow within the rim-rotor cooling ring 206 is mostly axial and tangential (no significant radial component), a partially guided curvature in the flow may be required before 236 or after the cooling guide vanes 213. The cooling guide vanes 213 may be curved in a way to combine a radial inlet on a fully or partially axial outlet. To accommodate the angled flow, the cooling ring 206 may have an angled inlet 220 (i.e., a surface(s) of the inlet 220 may be frustoconical) that reduces the entry pressure losses. The compactness of the radial cooling vanes 213B or radial-axial vanes 213A may provide the ability to maintain an insulating gap 227. The purpose of the insulating gap 227 is to avoid conductive heat transfer between the hot nozzle guide vanes 209 and the cooled cooling guide vanes lower shroud 216, therefore reducing heat transferred to the cooling air prior to the entry in the rim-rotor turbine 200 cooling ring 206. This insulating gap 227 also has a flow pulsation damping characteristic, therefore reducing the pressure differential between the cooling flow and the main flow pressure oscillation which reduces cooling requirements. Convective and radiative heat transfer between the hot nozzle guide vanes 209 and the cooled cooling guide vanes lower shroud 216 may be further reduced by limited the exposed area of the lower shroud 216, and/or by the insertion of an insulating material in the insulation gap 227. Compliant insulating material such as woven ceramic fibers or thermal barrier coating such as YTSZ ceramic coating could be applied on either or both of the outer surface of the nozzle guide vanes 209 outer shroud 217 or inner surface of the guide vanes lower shroud 216. The insulating gap 227 may be intentionally larger at assembly then the desired thickness at operation to allow the radial thermal expansion of the nozzle guide vanes 209 that is larger than that of the thermal expansion of the cooling guide vanes 213 due to higher operating temperature.

Figure 10:
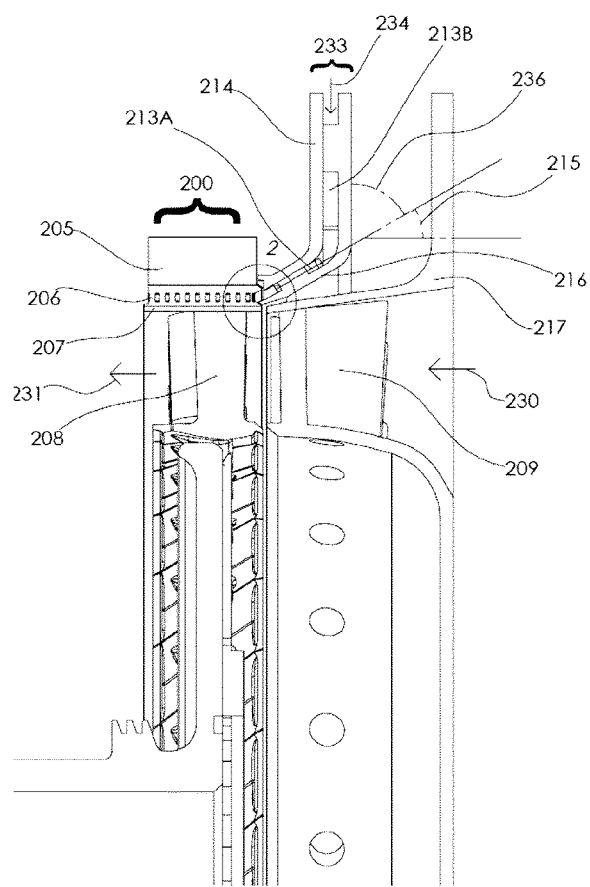
FIG. 10 is a cut view of the rim-rotor turbine of FIG. 9, indicating the introduction of a radial-axial angle of the cooling stator.
Figure 10A:
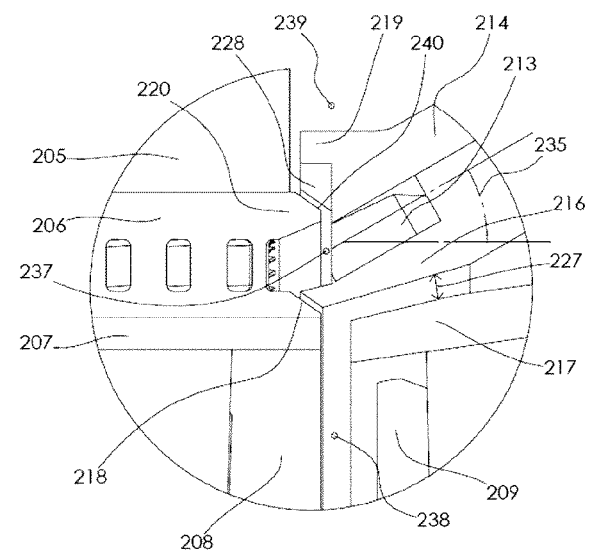
FIG. 10A is a close-up view of the rim-rotor turbine of FIG. 10 detailing how the cooling guide vanes are insulated from the nozzle guide vane and have seals to limit leakages from the cooling passages to either the main vein or the rim-rotor cavity, where abradable coating may be used to further improve sealing performance.

Referring to FIG. 10, the cooling guide vanes outer shroud 214 and inner shroud 217 as a possibility may extend toward the rim-rotor turbine cooling ring 206 to form lip seals 218 219 to reduce leakage of cooling flow. The outer shroud lip seal 219 may be added to minimize the operating clearance between the cooling ring 206 and the outer shroud 214 to reduce flow leakage from the cooling flow mixing plane 237 (cavity bound by the cooling guide vanes 213 outlet and the cooling ring 206) and the rim frontal cavity 239. As the pressure differential between the cooling flow mixing plane 237 and the rim frontal cavity 239 may be large, a radially repeated lip seal forming a labyrinth seal on the cooling ring 206 may be beneficial to reduce the leakage rate. The cooling guide vanes inner shroud lip seal 218 may be added to reduce the operating clearance between the cooling ring 206 and the inner shroud 216, to limit the flow leaking from the cooling flow mixing plane 237 to the main vein section 238 between the nozzle guide vanes 209 and the rim-rotor blades 208. The outer shroud of the main flow nozzle guide vanes 217 may also be extended below the rotor's thermal barrier coating 207 to create a seal stack up, increase sealing efficiency and reduce cooling losses as well as main flow ingress. The pressure at the cooling flow mixing plane 237 may be designed to match closely the pressure in the main vein 238, reducing flow crossing the lip seal 218. Due to the oscillatory nature of the pressure in those regions caused by the passing of blades and cooling channels, it remains beneficial to maintain the lip seal operating gap low to reduce flow leakage and avoid ingress of hot flow in the cooling ring 206. To further reduce the operating clearance, taking assembly tolerance and operating transient into account, an abradable material ring or coating 228 may be applied at the cooling guide vanes lip seal 218 219. The lip seals 218 219 or their coating 228 may be machined at an angle that matches the rim-rotor turbine blade movement primarily dictated by the blade-to-hub sliding plane in order to help maintain a smaller gap in startup and off-design conditions.

Figure 11:
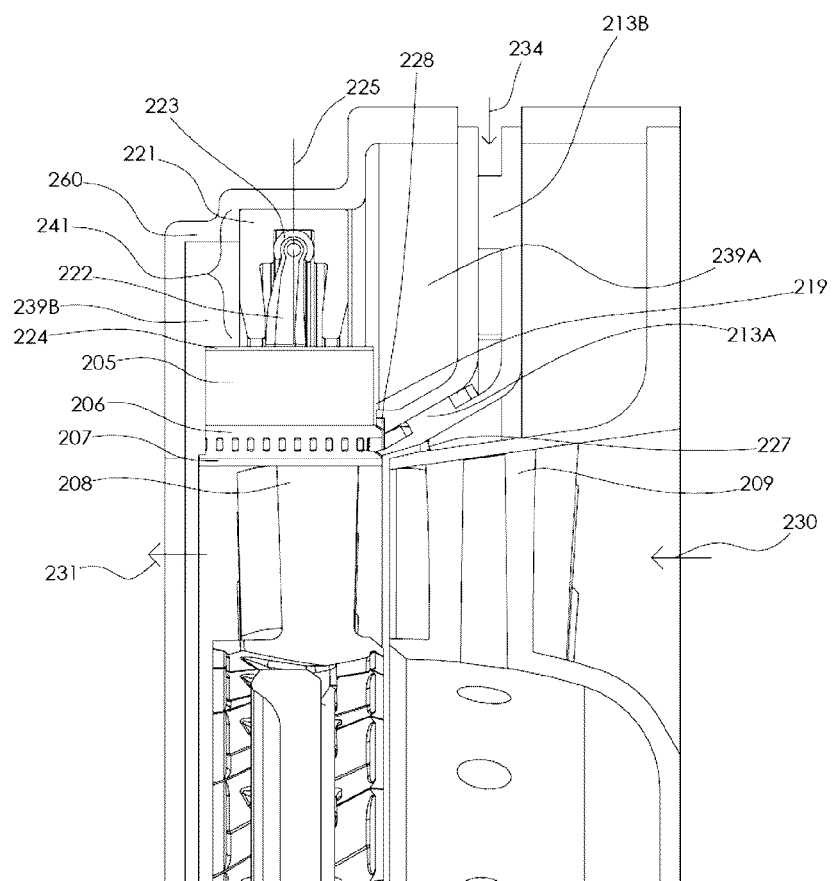
FIG. 11 is a cut view of a rim-rotor turbine stage with elements from FIG. 10 with the addition of a high-speed brush seal to reduce leakage flowing around the rim-rotor, and where the brushes ride on the outer surface of the rim-rotor which is protected from wear by an abrasion resistant coating.
Figure 12:
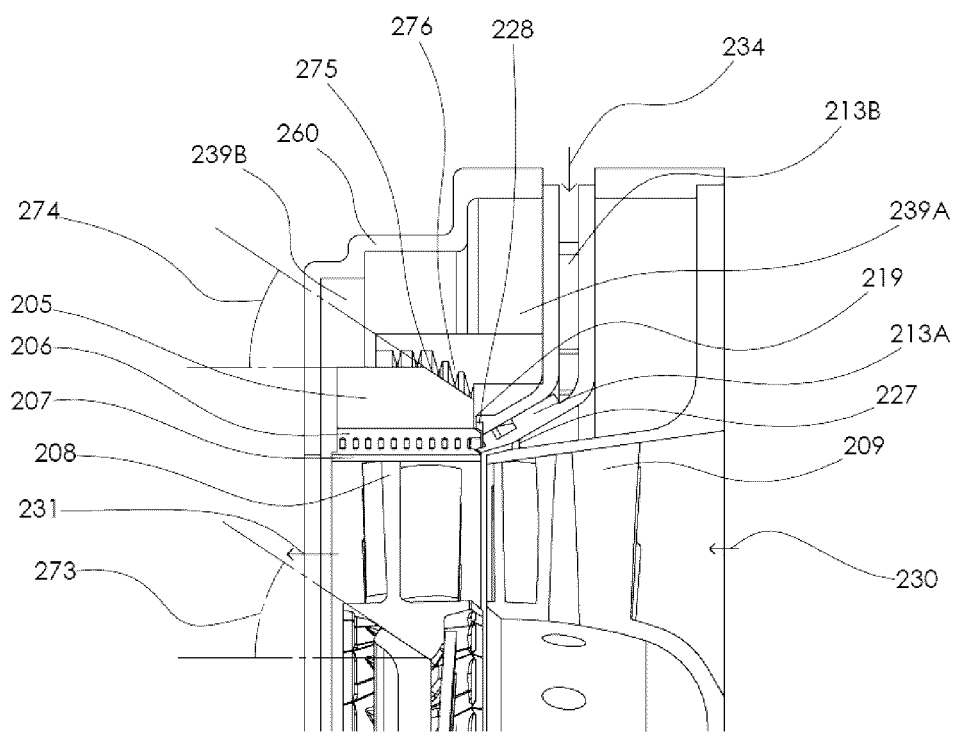
FIG. 12 is a cut view of a rim-rotor turbine stage with elements from FIG. 11 with the replacement of the brush seal by a labyrinth seal comprised of multiple teeth.
Figure 13:
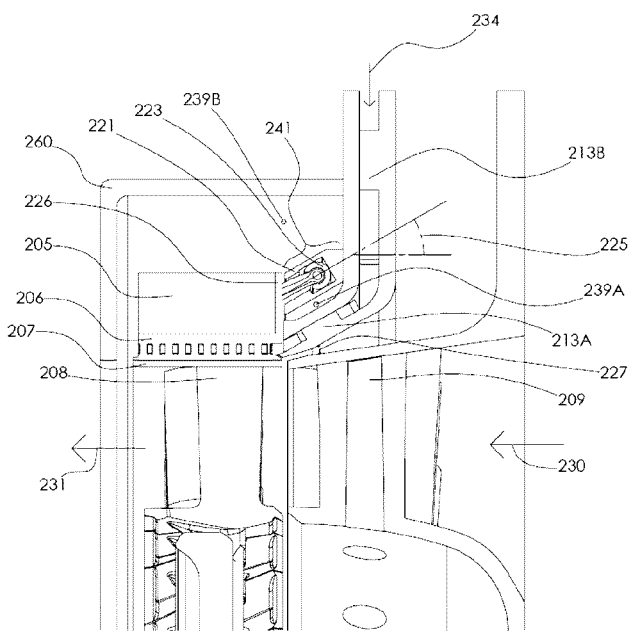
FIG. 13 is a cut view of a compact configuration of components from the rim-rotor turbine of FIG. 10 packaged with an axial or angled brush seal that ride on an extended metallic lip from the front of the cooling ring, providing high performance sealing and keeping the pressure in the rim cavity close to the main vein exit pressure, reducing windage losses on top of the rim-rotor.

Referring concurrently to FIG. 11, FIG. 12 and FIG. 13, the cooling guide vanes outer shroud lip seal 219 may be used in conjunction or replaced by a brush seal assembly 241. The brush seal assembly 241 may include a housing 221, an array of bristle 222 and a bristle retaining ring 223, the array of bristle 222 packed tightly to form a sealing surface. To prevent generating wear in the rim 205 material, a wear resistant coating may be applied to its outer surfaces, as shown in the radial embodiment the rim-rotor turbine brush seal in FIG. 11. In this configuration, the rim frontal cavity 239 is kept to a higher pressure than the rim aft cavity 240. Since the aerodynamic losses due to the rim 205 outer surface windage may be of large relative importance at these elevated speeds, reducing the density, and therefore the pressure, on the outer circumferential surface may represent a significant reducing in windage power loss and heat generation. Reducing the surface exposed to the higher pressure of the frontal cavity 239B, the axis of the brush seal assembly 241 may be oriented differently, i.e. either radially or axially or somewhere in between, to enable the bristles 222 to ride on the cooling ring 206 extension. The cooling ring extension may be radially outward 226 with an axial-radial brush seal assembly 240B, as depicted in FIG. 13. The brush seal installation angle 225 may optionally be set within 10 degrees of the cooling vane outlet angle 215 for a compact packing of the cooling vane assembly 233 and brush seal assembly 241. Cooling ring 206 with axial or radial-axial extension and radial brush seal may be possible depending on the length of the axial extension required (not shown). As the peripheral or tangential speed of the rim 205 and cooling ring 206 may reach 500 m/s and be higher than metallic brush seal maximum recommended speed regime, alternative bristle material such as aramid fibers (e.g. Kevlar®) may be used, as an example among others of contemplated materials. In the configuration where the rim 205 is made of composite material limited by the matrix glass transition temperature, the cooling air may exit the cooling guide vanes 213 below 150° C. to appropriately cool the rim 205 and such temperature would also provide the proper low-temperature environment for aramid fiber brush seal. The brush seal assembly 241 can be replaced by a labyrinth seal that may have one or a multitude of teeth riding on the outer surface of the rim-rotor 205. The gap 275 between the rim-rotor and the inner diameter of a tooth is designed in order to control the cooling leakage rate between the higher pressure frontal rim cavity 239A and the rear cavity 239B. The teeth may be parallel to the rim surface or may be at a rim sealing angle 274 in order to match the radial-axial movement of the rim rotor in all operating condition. The rim surface may be said to be frustoconical. This radial-axial movement is dictated mainly by the relation between the radial expansion under load of the rim-rotor and the sliding plane angle at the blade feet. Typically, this angle may be set to the blade sliding plane angle 273 (FIG. 12), yet due to thermal related movement of the static component in relation to the rotor, this angle may be adapted to best cover selected operating conditions and can be modified from the blade sliding plane angle 273 by up to 10 degrees. This angled cut of the rim-rotor may also be implemented for other sealing methods such as the brush seals for optimized sealing under non-nominal operating conditions (off-design operation). Stated different, FIG. 12 depicts a rim-rotor cutout in the same angle as the sliding plane to maintain a small controlled gap for a multitude of operating points as the blade slides upward on the feet sliding plane, thus reducing the overall cooling requirement. In some instances herein, the expression generally corresponding entails that a slight variation may be present.

Figure 14:
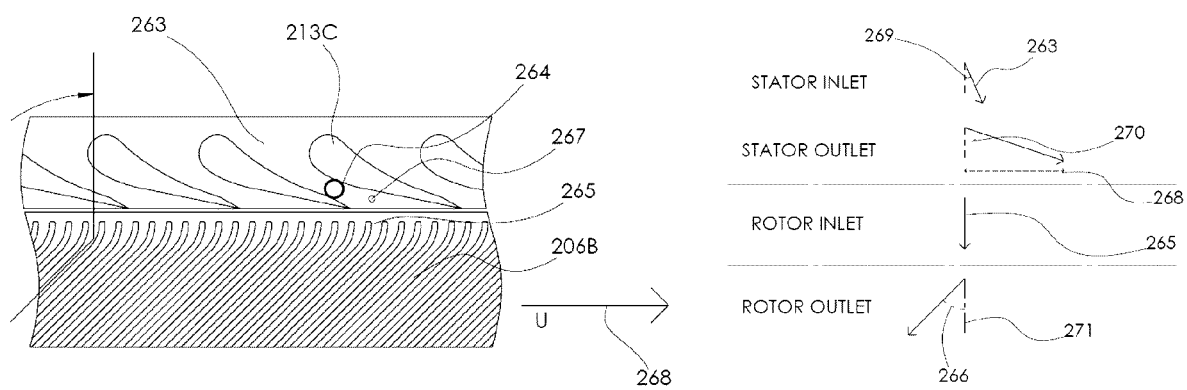
FIG. 14 is an unwrapped blade-to-blade cut view of the cooling layer of both the cooling guide vanes and the rim-rotor cooling ring where the airfoils are shaped to have a sonic throat at a desired operating condition, allowing the exit speed to be supersonic and the tangential velocity of the flow to match or surpass the cooling ring velocity, reducing the temperature and the pressure losses within the rotating frame.

As illustrated by the planar cut view of the cooling flow passages in FIG. 14, the cooling guide vanes 213 may be designed to accelerate the cooling flow supersonically, by way of a choked throat 264 and a supersonic expansion 267. By designing the supersonic cooling guide vanes 213B exit flow angle 270 values between 70 and 85 degrees, inclusively (relatively to an axial direction aligned with the axis of rotation), this configuration may allow the cooling flow tangential speed to match the cooling ring 206 tangential velocity (U) 268. The use of a supersonic cooling system may be beneficial even if subsonic or lightly transonic hot flow blade 208 are used due to the large difference in the speed of sound between the cooling flow and the main vain hot gases. Indeed, if the available cooling upstream pressure is sufficient, accelerating the fluid supersonically may reduce the work required on the rotor by skin friction (reducing windage or drag) and may increase the cooling performance by reducing the static temperature of the cooling flow transferred to the cooling ring 206 and on the rim 205 surfaces. The cooling ring fins 206B may be oriented at an angle 266 to accelerate the fluid tangentially within the rotating frame in the opposite direction to the rotating direction (U) generating additional trust and improving system efficiency.

Figure 15:
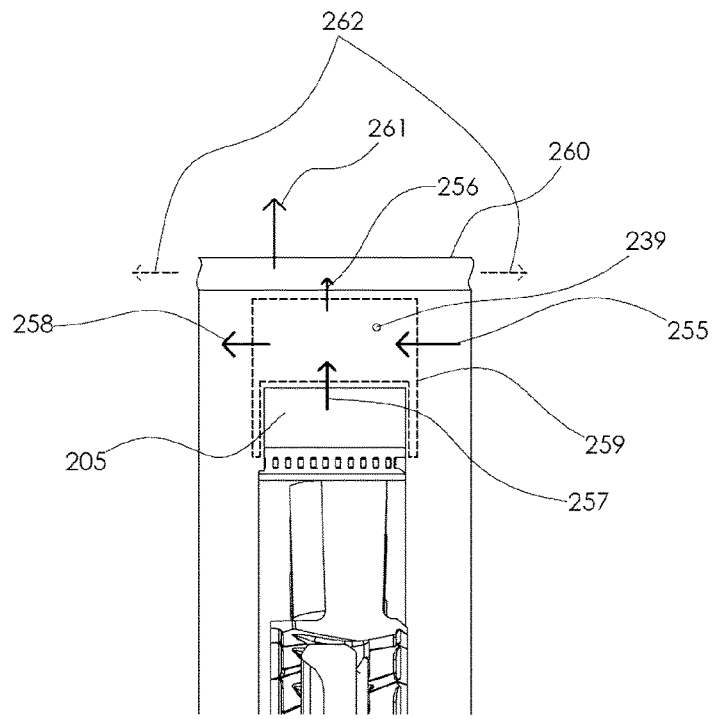
FIG. 15 is a cut view of the rim-rotor turbine embodiment where the heat generated by windage within the rim-rotor cavity is partially removed by advection of pressurized cooling flow, by conduction in the turbine casing and by convection from the casing towards a surrounding cooling fluid.

Referring to FIG. 15, the heat generated by skin friction drag (windage) on the structural rotating rim 205 may convey sufficient heat energy 257 into the rim cavity 239 to melt, oxidize, weaken or damage the rim 205. To avoid such events, which may lead to failure of the rim-rotor turbine 200 wheel under operation, extracting heat from the rim 205 and its surrounding is critical to a safe operation of a rim-rotor turbine 200. Advection may be the primary means of extraction heat, which in this context is the transport of heat energy by a motion of the air filling the rim cavity 239 outside of the cavity. Fresh air may be injected in the rim cavity 239 through the cooling guide vanes lip seal 219, and may then exit the cavity 239 by flowing into the main vein rim-rotor turbine outlet 231. In cases where the injection of such air into the main vein may decrease the cycle efficiency due to the reduction of the main vein bulk temperature, this cooling air may be ejected outside towards the environment (not shown). Alternatively, this cooling air may be used to cool the following turbine stage inlet guide veins or the following turbine stage wheel, may it be a rim-rotor turbine or standard turbine (not shown). As a mean to improve the heat extraction from the rim 205 surface and its surroundings, the surrounding housing 260 may provide heat extraction by a combination of convection and radiation. To do so, the surrounding housing 260 may be cooled by conduction 262 via a connected housing and/or by convection and radiation on its outer external surfaces surface(s) 261. Convection on the housing external surfaces 261 may be provided by forced external air, for example a low-pressure fan pushing cooling air on the housing surfaces, which may not require pressurized air as it is external to the main vein. Using non-pressurized air for the housing external cooling gives a net reduction in power requirement at the turbine engine compressor and therefore improve the system energy conversion efficiency.

Figure 16:
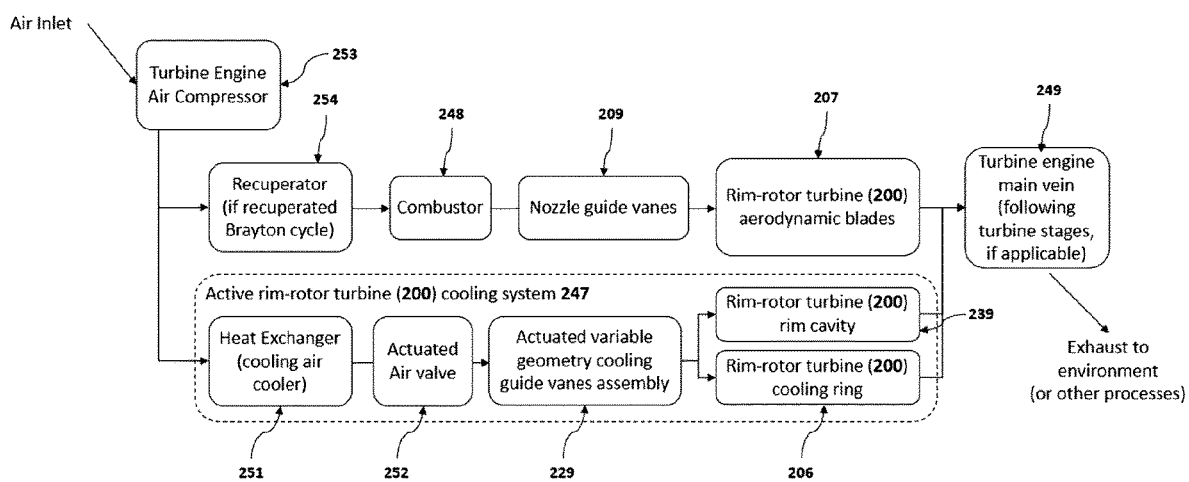
FIG. 16 is a block diagram presenting an air flow sequence for a rim-rotor turbine with active rim-rotor cooling system that produce best system efficiency under a wide range of turbine operating conditions by lowering cooling requirements and maximizing performance.

Referring to FIG. 16, a turbine engine incorporating a rim-rotor turbine 200 may provide substantial performance gains (i.e. increase in efficiency and in power output) by integrating an active rim-rotor cooling system 247. Considering nominal design conditions with optimal cooling flow and performance ('on-design'), operation at off-nominal conditions such as varied rotor rotational speed, ambient pressure, ambient temperature or fuel flow ('off-design') will generate a wide range of operating conditions in which it would be beneficial to minimize the rim-rotor turbine 200 cooling flow without risking overheating or damaging the rim 200. The active rim-rotor cooling system may have an air-cooler heat-exchanger 251, an actuated air valve 252, and an actuated variable geometry cooling guide vanes assembly 229, in order to supply cooling air at the adequate pressure and temperature to both the cooling ring 206 and the rim cavity 239. The air-cooler heat exchanger 251 is used to lower the cooling air temperature by extracting heat and transferring it to a secondary fluid (not shown), that may be a liquid like water, oil or fuel, or directly exchanging with forced ambient air. The actuated air valve 252 may be partially closed to generate a pressure drop in the cooling circuit, effectively reducing the rim-rotor cooling flow for a given compressor outlet pressure. In the event that the pressure exiting the cooling guide vanes assembly 229 is lower than the main vein pressure, either caused by the closing of the actuated air valve 252 or a change in operating conditions, the cooling ring 206 may ingest a mixture of cooling flow and hot gases, which may results in overheating of the rim 205 and potential failure of the rim-rotor turbine 200. To avoid such circumstances, an actuated variable geometry cooling guide vanes 229 may be used to adjust the momentum given to the cooling air by changing the angle of its guiding vanes. This movement results in a change in the guide vanes exit static pressure, and can therefore ensure an acceptable cooling air leakage 246 between the cooling flow and the main vein maintained in a wide range of conditions and avoid the ingestion of hot gases in the cooling flow. Other standard turbine engine components may be present, such as a combustor 248, a turbine engine air compressor 253, a recuperator 254.

An embodiment of an actuated variable geometry cooling guide vanes 229 is illustrated in FIG. 17 and in FIG. 17A. In this configuration, the cooling ring 206 of the rim-rotor turbine 200 is fed with cooling air flowing through the actuated variable geometry cooling guide vanes 229. The cooling air flows radially from a circumferential cooling air injection location 234, and is guided by the pivoting cooling guide vanes 201 imparting tangential velocity to the air before turning axially and flowing towards the cooling ring 206. The exit of the actuated variable geometry cooling guide vanes 229 may be partially axial-radial, may contain an insulation gap between the nozzle guide vanes 209 and the cooling guide vanes lower shroud 203, and/or may have sealing components as depicted earlier in FIG. 10, FIG. 11 of FIG. 13, some or all of which may be present in the embodiment of FIG. 17. Each of the pivoting cooling guide vane 201 may be mounted with a rotating movement axis 210 and may be connected to a control arm 245 located behind the cooling guide vanes lower shroud 203. Each of the control arms 245 may be fitted within a slot in a control ring 202 where a given change in the control ring 202 angular position generates a force on the control arm 245 and makes each of the pivoting cooling guide vane 201 rotate around its axis 210 by a given angular position. The pivoting cooling guide vane 201 angular position is directly related to the size of the guide vane throat 272 between two adjacent vanes. Closing the guide vanes results therefore in a smaller throat, and opening the guide vanes results in an increase in the throat size by the mean of rotating the guide vanes. A smaller opening may cause an increase in velocity and lower static pressure at the throat and at the vanes exit. A linear pneumatic actuator 211 or other mechatronic component may control the angular position of the control ring 202. Thus a single degree of actuation may result in the movement of all guide vanes 201, as one possible embodiment. The linear movement of the pneumatic actuator 211 may be converted to an angular position of the control ring 202 by acting through a control lever directly on one of the control arm 245, or have its own control arm that slides within the control ring (not shown). The geometry describe here is analog to a variable geometry turbocharger (VGT) or a variable nozzle turbine (VNT), and other geometry such as a moving/sliding ring variable geometry turbocharger variable flow turbocharger (VFT) may provide the same function and may be used interchangeably within the active rim-rotor turbine cooling system for performance, packaging or cost reason.

To evaluate, monitor and control the state of the active rim-rotor cooling system 247 and of the rim-rotor turbine 200 structural and material integrity, a dedicated cooling control system 279 may be implemented in the digital turbine engine controller. The controller may be a processing unit with one or more processors, and a non-transitory computer-readable memory communicatively coupled to the processing unit and comprising computer-readable program instructions executable by the processing unit for operating the system 279. The output of the control system 279 may be electrical or pneumatic control signals 284 285 to the air valve actuator and the cooling guide vanes actuator. A set of measured or estimated operating conditions 287 may be used within the algorithm to a generate a feedforward position demand 282 283 to the air valve 252 and the cooling guide vanes 201 that would provide the required cooling flow and pressure within the rim-rotor cooling ring 206. The operating conditions 287 may include the engine spool, or spools, speed, the engine fuel flow, engine air flow, ambient temperature and pressure, and other relevant conditions. The feedforward demand 282 283 may be calculated through a set of calibrated maps or a calibrated multi-variable model 280. Calibration of such maps or model may be initially done through numerical simulations, and the final calibration may be conducted by experimental testing in relevant conditions. In addition, the control system may use rim-rotor turbine related measurement 288 of pressure(s) and temperature(s) to compute a feedback correction to the feedforward demand to provide the corrected position demand 282 283. The seal pressure differential 242 taken at the exit of the cooling guide vane 229 between both sides of the cooling guide vanes inner shroud lip seal 218 may provide critical information to minimize leakages through the lip seal 218 while avoiding the ingestion of hot flow. To monitor the outer rim 205 surface thermal conditions, measurement of the air temperature in the rim cavity 243 with a thermocouple or other air temperature sensor may be taken. To assess the temperature of the rim 205 at its inner surface, measurement of the cooling ring 206 exit temperature 244 with a thermocouple or other air temperature sensor may be taken and may be converted to actual rim temperature via a correlation programed within the engine controller. The rim-rotor turbine related measurement 288 may be fed to a set or PIDs (Proportional-Integrate-Derivative) controller to adjust the corrected position demand 282 283 by limiting the deviation in temperature or pressure from the desired conditions. The desired temperature and pressure conditions may computed based on the engine mode 286. In aeronautical application, the temperature limit may be raised during take-off or emergency conditions to maximize power output of the engine. Similarly, the temperature limit may be decrease during cruise segment to increase life of the rim-rotor turbine 200 component. In cases where rim-rotor turbine instrumentation is not installed or not functional, the control logic of the active rim-rotor cooling system 247 may be set in open-loop control relying only on the feed-forward demand 280 signal. In term of cooling system 247 operation, the opening or the closing of the cooling flow air valve 252 will respectively increase or decrease the cooling mass flow flowing through the cooling ring 206, directly influencing the amount of heat extracted and therefore the temperature of the rim 205. The closing of pivoting cooling guide vane 201 is necessary to adjust the static pressure at the seal to avoid ingestion of hot flow or excessive leakages of cooling air. The change in tangential velocity provided by the angular change also contribute to the mass flow control within the cooling ring 206 by controlling the pressure losses attributed to the change in direction between the static parts (the cooling guide vanes assembly 229) and the rotating component (cooling ring 206). Such control system would allow the turbine engine to operate at the design conditions without over-cooling, while offering the possibility to operate in over-power situation with increased cooling when higher fuel flow and turbine temperature are required (for example, for One-Engine-Inoperative (OEI) flight conditions). Other conditions, such as in part load conditions where high turbine temperature may be seen but low compressor pressure would drive insufficient cooling flow if it was not adjusted by the active rim-rotor cooling system 247.

Figure 19:
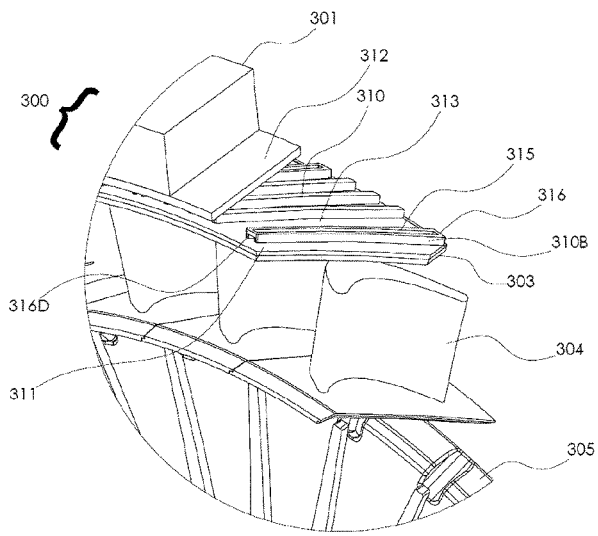
FIG. 19 is a perspective cut view of a rim-rotor turbine showing the balancing channels integrated into the cooling ring to provide a mean to balance the rotor prior to operation.
Figure 19A:
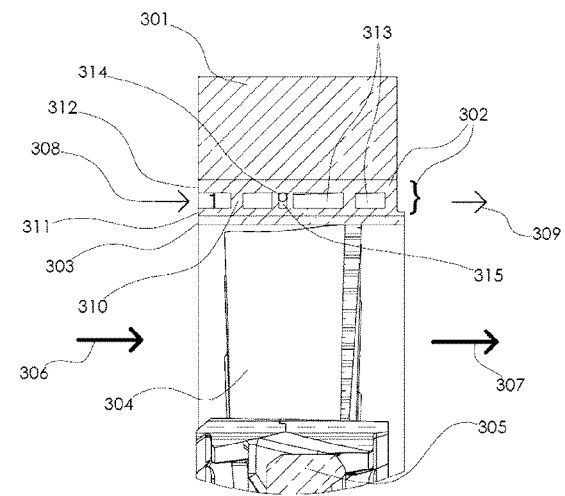
FIG. 19A is a cut view of the rim-rotor turbine of FIG. 19 showing the wire mass added into the balancing channel to perform the rotor balancing.
Figure 20:
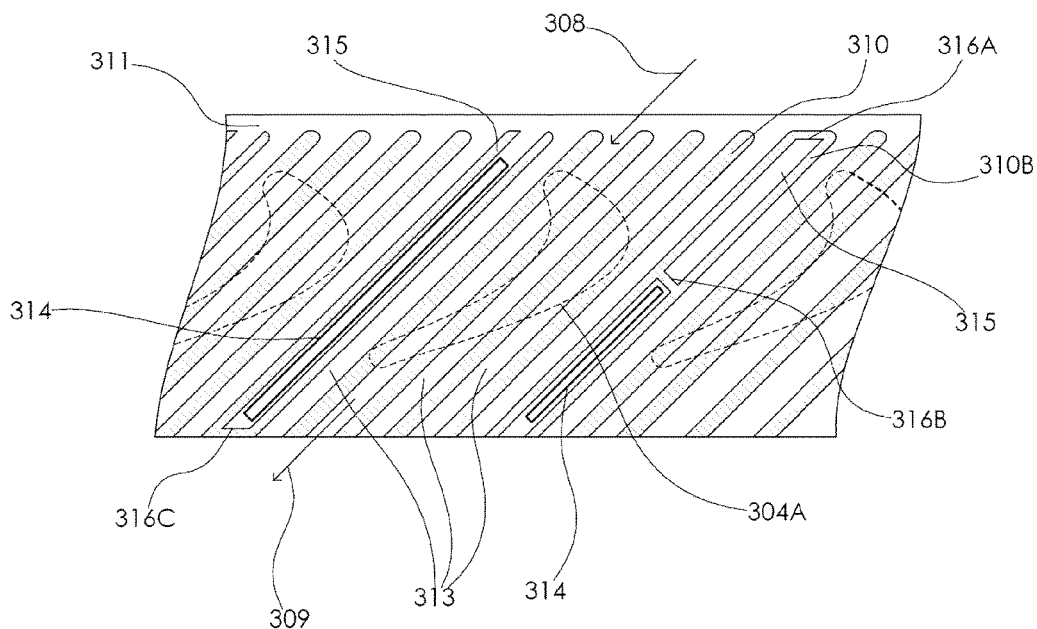
FIG. 20 is an unwrapped view of cooling ring channels where the balancing channel may be blocked at the inlet, outlet or in the middle to prevent the balancing wire to move during operation.

Concurrently referring to FIG. 19, FIG. 19A and FIG. 20, a rim-rotor turbine rotor 300 is illustrated, which is composed of an outer rim 301, a cooling ring 302, a thermal barrier coating 303, a plurality of turbine blades 304 connected to the hub assembly 305 maintaining the system in place and transmitting the mechanical power to a shaft. The rim-rotor turbine 300 may be similar to the rim-rotor turbines 100 and 200 described above, relative to the components 301, 302, 303 and/or 304, and may use some of the embodiments described relative to the turbines 100 and/or 200. Elevated temperature gases flow through the blade 304 row to generate lift on the blades 304. To maintain the structural rim 301 within its maximum operating temperature, cooling air flows through the cooling ring 302. In this embodiment, the cooling ring 302 comprise a set of fins 310, a lower skin 311 and an upper skin 312, forming air-flowing cooling channels 313. The number of cooling channels 313 is preferably a multiple of the blade 304 count, typically 3 cooling channel per blade or more, though this is optional. The air channels 313 depicted are rectilinear channels on a plane tangential to the cooling ring surface that are then wrapped onto that surface, and variation of the cooling channels geometry may include curvature, i.e. a different entry axial flow angle then it's exit axial flow angle. The cooling ring 302 may be made from a single part, by manufacturing processed such as additive manufacturing (AM) or electrical discharge machining (EDM), or an assembly of independent parts.

Turbine rotor requires precise balancing to reduce unbalance forces applied to the rotor shaft and the turbine bearings. A rim-rotor turbine has a particular balancing impact, since a larger portion of the rotor mass is placed within the outer shroud, composed of the rim 301 with cooling ring 302 and thermal barrier coating 303. Therefore, due to assembly and manufacturing tolerances, a larger portion of the unbalance may arise from the outer shroud, and should logically be corrected directly within the outer shroud. Such balancing can be done by either the addition or the removal of material within the outer shroud. Due to the high tangential velocity of the outer shroud, all of its components are submitted to substantial stresses under operation, and the impact of the unbalance masses must be carefully analyzed. This embodiment presents the insertion of a balancing mass(es) 314 within one or more of the cooling channels 302, converting that cooling channel 313 to a balancing channel 315, effectively creating a partial inlet cooling ring. To ensure uniform performance of the cooling system, a fixed number of cooling channel 313 per blades 304 may be converted to balancing channels 315. For the depicted example, six cooling channels 313 are present per rotor blade 304, and one of them is converted to a balancing channel 315. The selection of which cooling channel to convert depends on the structural and thermal loading of the cooling ring, and since the largest compressive load and thermal conduction through the cooling ring fins 310 is typically at the blade tip in contact with the outer shroud 304A, the balancing channel location preferred is at the center between the two adjacent blades 304. To ensure no flow goes through the selected balancing channel 315 in the event that it is not filled or not fully blocked with a balancing mass 314, a balancing channel blockage 316 may be placed in each of the dedicated balancing channel 315, either at fabrication of the cooling ring 302 or when the rotor balancing is performed. The location of the balancing channel blockage 316 may be placed at the inlet 316A at the outlet 316C or at an intermediate location 316B. A central blockage feature may allow the balancing to be completed on two balancing planes, one on each faces of the rim-rotor, which may be required for high quality balancing for thick disk, therefore depending on the final ratio between outer shroud axial thickness over its radius. To accommodate the balancing mass 314 shape and reduce the impact on the thermal performance, the balancing channel 315 surrounding fins 310B may have reduced or varied thicknesses to minimize the balancing channel overall width. Such adapted balancing channel may also include balancing mass 314 retaining feature, such as a thread to insert a screw, a deformable wall that can be closed off, a partial blockage 316D that leaves an orifice that is at a smaller radius then the operating position (using the g-field in operation to prevent it to slide outside the channel) or other similar method that ensures the balancing mass cannot exit the channel once balancing is performed.

Instead of inserting a balancing mass within the balancing channel 315, a material removal approach may be used. An adapted balancing channel (not shown) may start with smaller cylindrical channel that can be drill to remove material.

In cases where the rim-rotor turbine 300 is not designed to accommodate such method within the outer shroud, balancing masses may be added or removed within the hub assembly 305. However, such method may provide a balanced rim-rotor turbine assembly, yet having an unbalanced outer shroud compensated with an unbalanced hub, which may create substantial unbalance forces within the rotor itself. Those forces would be transferred from the outer shroud to the hub through the blades and may results in component premature failures.

The present disclosure describes numerous embodiments that cover different parts of the rim-rotor assembly 100. Different ones of the embodiments can be combined in any appropriate way.

The invention claimed is:

1. An assembly comprising:
a rim-rotor turbine having
a hub adapted to be mounted or connected to a rotating shaft,
a rim-rotor, the rim-rotor having a cooling ring defining at least one cooling channel, and
a plurality of blades with each of the plurality of blades contacting the rim-rotor;
a stator vane assembly positioned upstream of the rim-rotor turbine, the stator vane assembly having at least
an outer shroud defining a main flowpath aligned with the plurality of blades of the rim-rotor turbine and configured to direct hot gas toward the plurality of blades of the rim-rotor turbine, and
vanes in the main flowpath; and
a cooling guide vane assembly having at least
an inner shroud defining a cooling flowpath aligned with the cooling ring of the rim-rotor turbine and configured to direct cooling gas toward the cooling ring of the rim-rotor turbine, and
vanes in the cooling flowpath;
wherein the outer shroud of the stator vane assembly is radially inward of the inner shroud of the cooling guide vane assembly, and wherein a circumference gap is defined therebetween.

2. The assembly according to claim 1, wherein the cooling guide vane assembly includes an outer shroud, the cooling flowpath being defined between the inner shroud and the outer shroud of the cooling guide vane assembly.

3. The assembly according to claim 2, wherein an upstream portion of the cooling flowpath has a radial orientation relative to an axis of rotation of the rim-rotor.

4. The assembly according to claim 2, wherein a downstream portion of the cooling flowpath has a frustoconical orientation relative to an axis of rotation of the rim-rotor.

5. The assembly according to claim 4, wherein the downstream portion of the cooling flowpath is at an angle ranging between 10 and 40 degrees inclusively relative to the axis of rotation of the rim-rotor.

6. The assembly according to claim 2, wherein a first set of the vanes in the cooling flowpath are oriented to impart an axial or partially axial flow of cooling air.

7. The assembly according to claim 6, wherein choked throats are defined between the vanes in the first set.

8. The assembly according to claim 6, wherein an exit angle for the vanes of the first set are between 70 and 85 degrees, inclusively, relative to an axial direction.

9. The assembly according to claim 2, wherein the vanes in the cooling flowpath are oriented to impart a radial and tangential flow of cooling air.

10. The assembly according to claim 2, wherein a projecting end of the outer shroud of the cooling guide vane assembly defines an outer shroud lip seal adjacent to a surface of the rim-rotor.

11. The assembly according to claim 1, wherein a projecting end of the inner shroud of the cooling guide vane assembly defines an inner shroud lip seal adjacent to a surface of the rim-rotor.

12. The assembly according to claim 11, wherein the inner shroud lip seal has a surface that is at an angle relative to a rotational axis of the rotating shaft generally corresponding to an angle of a surface of sliding contact between the blades and the hub relative to the rotational axis of the rotating shaft.

13. The assembly according to claim 1, wherein an insulating material is in the gap.

14. The assembly according to claim 13, wherein the insulating material is a thermal barrier coating on the inner shroud of the cooling guide vane assembly and/or on the outer shroud of the stator vane assembly.

15. The assembly according to claim 1, further including a brush seal between the rim-rotor and a surrounding structure.

16. The assembly according to claim 15, wherein the brush seal is mounted to the surrounding structure.

17. The assembly according to claim 1, further including a labyrinth seal between the rim-rotor and a surrounding structure.

18. The assembly according to claim 17, wherein the labyrinth seal is mounted to the surrounding structure, the labyrinth seal being opposite a frustoconical surface of the rim-rotor, an angle of the frustoconical surface relative to a rotational axis of the rotating shaft generally corresponding to an angle of a surface of sliding contact between the blades and the hub.

19. The assembly according to claim 1, wherein each of the plurality of blades are operatively connected to the hub by a sliding contact with the hub allowing at least a radial motion between the blades and the hub to load the blades in compression against the rim-rotor.

20. The rim-rotor turbine assembly according to claim 1, wherein the blades are in sliding contact with the hub, the sliding contact being defined by complementary sliding surfaces between the hub and the blades.

* * * * *